US012299941B2

(12) United States Patent
Huang et al.

(10) Patent No.: US 12,299,941 B2
(45) Date of Patent: May 13, 2025

(54) VERTEX REORDERING FOR MESH COMPRESSION

(71) Applicant: Tencent America LLC, Palo Alto, CA (US)

(72) Inventors: Chao Huang, Palo Alto, CA (US); Xiang Zhang, Sunnyvale, CA (US); Jun Tian, Belle Mead, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 187 days.

(21) Appl. No.: 17/903,505

(22) Filed: Sep. 6, 2022

(65) Prior Publication Data
US 2023/0074762 A1 Mar. 9, 2023

Related U.S. Application Data

(60) Provisional application No. 63/241,876, filed on Sep. 8, 2021, provisional application No. 63/241,883, filed on Sep. 8, 2021.

(51) Int. Cl.
*G06T 17/20* (2006.01)
*G06T 9/00* (2006.01)

(52) U.S. Cl.
CPC .............. *G06T 9/001* (2013.01); *G06T 17/20* (2013.01)

(58) Field of Classification Search
CPC ................................ G06T 9/001; G06T 17/20
(Continued)

(56) References Cited

U.S. PATENT DOCUMENTS 6,047,088 A 4/2000 Van Beek et al.
2018/0253867 A1* 9/2018 Laroche .................. G06T 17/20
(Continued)

FOREIGN PATENT DOCUMENTS

JP       WO2022269944    *  6/2021   ............ G06T 19/00
WO      2020/180161 A1     9/2020
WO      2021/116838 A1     6/2021

OTHER PUBLICATIONS

J. Rossignac, "Edgebreaker: connectivity compression for triangle meshes," in IEEE Transactions on Visualization and Computer Graphics, vol. 5, No. 1, pp. 47-61, Jan.-Mar. 1999.
(Continued)

*Primary Examiner* — Jin Ge
(74) *Attorney, Agent, or Firm* — ARENTFOX SCHIFF LLP

(57) ABSTRACT

Aspects of the disclosure provide methods and apparatuses for mesh coding (e.g., compression and decompression). In some examples, an apparatus for mesh coding includes processing circuitry. The processing circuitry decodes an array of attributes from a bitstream carrying a three dimensional (3D) mesh frame that includes a plurality of patches. The array of attributes corresponds to vertices of the 3D mesh frame. The vertices of the 3D mesh frame are ordered into subsets respectively belonging to the plurality of patches. The processing circuitry determines a first portion of the array of attributes corresponding to a first subset of the vertices of the 3D mesh frame. The first subset belongs to a first patch in the plurality of patches. The processing circuitry determines first connectivity information of the first subset of the vertices, and reconstructs the first patch of the 3D mesh frame based on the first portion of the array of attributes and the first connectivity information.

20 Claims, 16 Drawing Sheets

(58) Field of Classification Search
USPC .......................................................... 345/419
See application file for complete search history.

(56) References Cited

U.S. PATENT DOCUMENTS

| | | | |
|---|---|---|---|
| 2020/0279403 A1* | 9/2020 | Vosoughi | ............ H04N 19/182 |
| 2020/0286261 A1* | 9/2020 | Faramarzi | ............... G06T 9/001 |
| 2020/0351484 A1* | 11/2020 | Aflaki | ........................ G06T 7/41 |
| 2021/0090301 A1* | 3/2021 | Mammou | ................ G06T 7/11 |
| 2021/0209806 A1 | 7/2021 | Oh et al. | |
| 2022/0108483 A1* | 4/2022 | Graziosi | ................. G06T 17/20 |
| 2022/0164994 A1* | 5/2022 | Joshi | ..................... G06T 17/205 |
| 2023/0068178 A1* | 3/2023 | Schwarz | ................ G06T 9/001 |

OTHER PUBLICATIONS

Shewchuk, Jonathan Richard. "Delaunay refinement algorithms for triangular mesh generation." Computational geometry, vol. 22, Issues 1-3, pp. 21-74, May 2002.

"G-PCC codec description", WG 7, MPEG 3D Graphics Coding, 133. MPEG Meeting, Motion Picture Expert Group, ISO/IEC JTC 1/SC 29/WG 7 N0057, v10, No. n20028, XP030295805, 2021, 150 pages.

"White paper on Three-Dimensional Graphics Compression (3DGC)", 117. MPEG Meeting, Geneva, Motion Picture Expert Group or ISO/IEC JTC1/SC29/WG11), No. n16662, XP030023330, Jan. 23, 2017.

Balagondar A., "Mesh compression: Theory & practice", University of Windsor, 2005, 106 pages.

Extended European Search Report and Search Opinion received for European Application No. 22868279.5, mailed on Jul. 6, 2023, 12 pages.

Graziosi D.B., "Video-Based Dynamic Mesh Coding", 2021 IEEE International conference on Image processing, ( ICIP 2021), IEEE, XP034123318, Sep. 19, 2021, pp. 3133-3137.

Graziosi et al., "[VPCC] [EE2.6-related] Mesh Geometry Smoothing Filter", 132. MPEG Meeting, Motion Picture Expert Group or ISO/IEC JTC1/SC29/WG11, No. m55374, XP030291886, 2020, 6 pages.

Office Action received for Japanese Patent Application No. 2023-534146, mailed on May 7, 2024, 19 pages (9 pages of English Translation and 10 pages of Original Document).

Office Action received for Korean Patent Application No. 10-2023-7016037, mailed on Jul. 21, 2024, 11 pages (6 pages of English Translation and 5 pages of Original Document).

Villescas M.R., "3D Face Reconstruction using Structured Light on a Hand-held Device", Eindhoven University of Technology, 2020, 88 pages.

Zhang et al., "[V-CG] Tencent's Dynamic Mesh Coding CfP Response", 138. MPEG Meeting, Motion Picture Expert Group or ISO/IEC JTC1/SC29/WG11), No. m59295, XP030301455, Apr. 16, 2022.

\* cited by examiner

VERTEX REORDERING FOR MESH COMPRESSION

INCORPORATION BY REFERENCE

This present application claims the benefit of priority to U.S. Provisional Application No. 63/241,876, "Vertex Reordering for Mesh Compression" filed on Sep. 8, 2021, and U.S. Provisional Application No. 63/241,883, "Vertex Reordering for Mesh Compression" filed on Sep. 8, 2021. The entire disclosures of the prior applications are hereby incorporated by reference in their entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry decodes an array of attributes from a bitstream carrying a three dimensional (3D) mesh frame that includes a plurality of patches. The array of attributes corresponds to vertices of the 3D mesh frame. The vertices of the 3D mesh frame are ordered into subsets respectively belonging to the plurality of patches. The processing circuitry determines a first portion of the array of attributes corresponding to a first subset of the vertices of the 3D mesh frame. The first subset belongs to a first patch in the plurality of patches. The processing circuitry determines first connectivity information of the first subset of the vertices, and reconstructs the first patch of the 3D mesh frame based on the first portion of the array of attributes and the first connectivity information.

In an example, the processing circuitry decodes a 2 dimensional (2D) image corresponding to an array of 3 dimensional coordinates of the vertices. In another example, the processing circuitry decodes a 2D image corresponding to an array of uv coordinates of the vertices. In another example, the processing circuitry decodes a first 2D image and a second 2D image respectively corresponding to a first array of u coordinates of the vertices and a second array of v coordinates of the vertices.

In some examples, the processing circuitry decodes, from the bitstream, a first value indicative of a number of vertices in the first subset of the vertices of the 3D mesh frame, and selects the first portion of the array of attributes based on the first value. Further, in an example, the processing circuitry decodes, from the bitstream, a second value indicative of a number of boundary vertices in the first subset, and determines the attributes of the boundary vertices from the first portion of the array of attributes based on the second value.

In some examples, the processing circuitry selects, from the first portion of the array of attributes, the attributes of the boundary vertices that are ordered before the attributes of other vertices in the first subset.

In some examples, the attributes comprise coordinates, the processing circuitry decodes boundary coordinate residuals for the boundary vertices, and combines the coordinates of the boundary vertices with the boundary coordinate residuals of the boundary vertices to obtain recovered coordinates of the boundary vertices. The coordinates of the boundary vertices can be 3 dimensional (3D) coordinates of the boundary vertices and/or uv coordinates of the boundary vertices, and the boundary coordinates residuals for the boundary vertices can be boundary 3D coordinates residuals and/or boundary uv coordinates residuals.

In some examples, the processing circuitry detects that a first vertex and a second vertex have identical coordinates, and removes one of the first vertex and the second vertex from the reconstructing of the first patch.

In some examples, the processing circuitry detects that a non-boundary vertex of the first patch is outside a boundary (boundary edges) formed by the boundary vertices of the first patch, and the processing circuitry removes the non-boundary vertex and reconstructs the first patch of the 3D mesh frame without the non-boundary vertex.

In some examples, the processing circuitry infers the first connectivity information of the first subset of the vertices. In some other examples, the processing circuitry decodes, from the bitstream, the first connectivity information of the first subset of the vertices.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
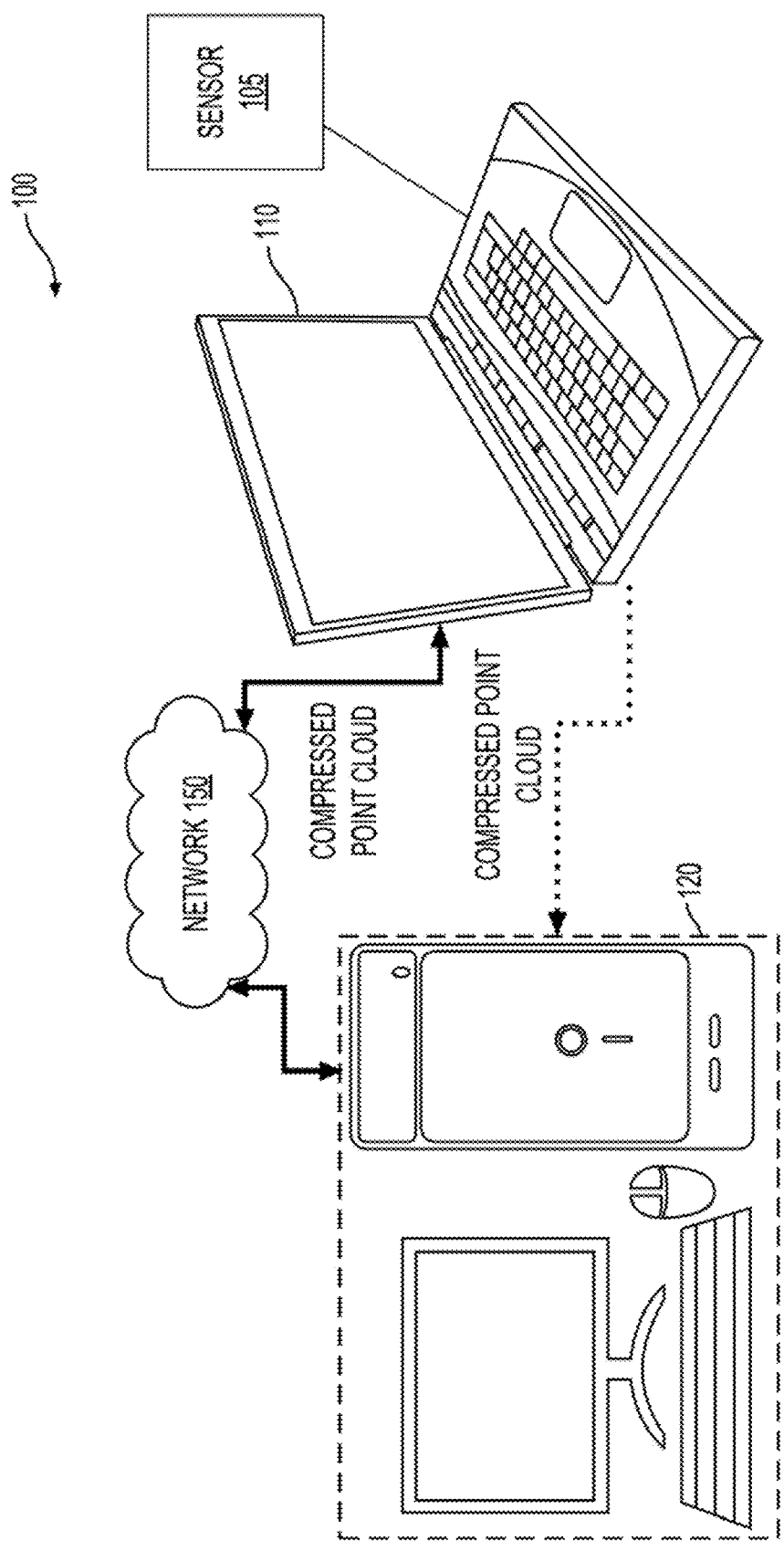
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
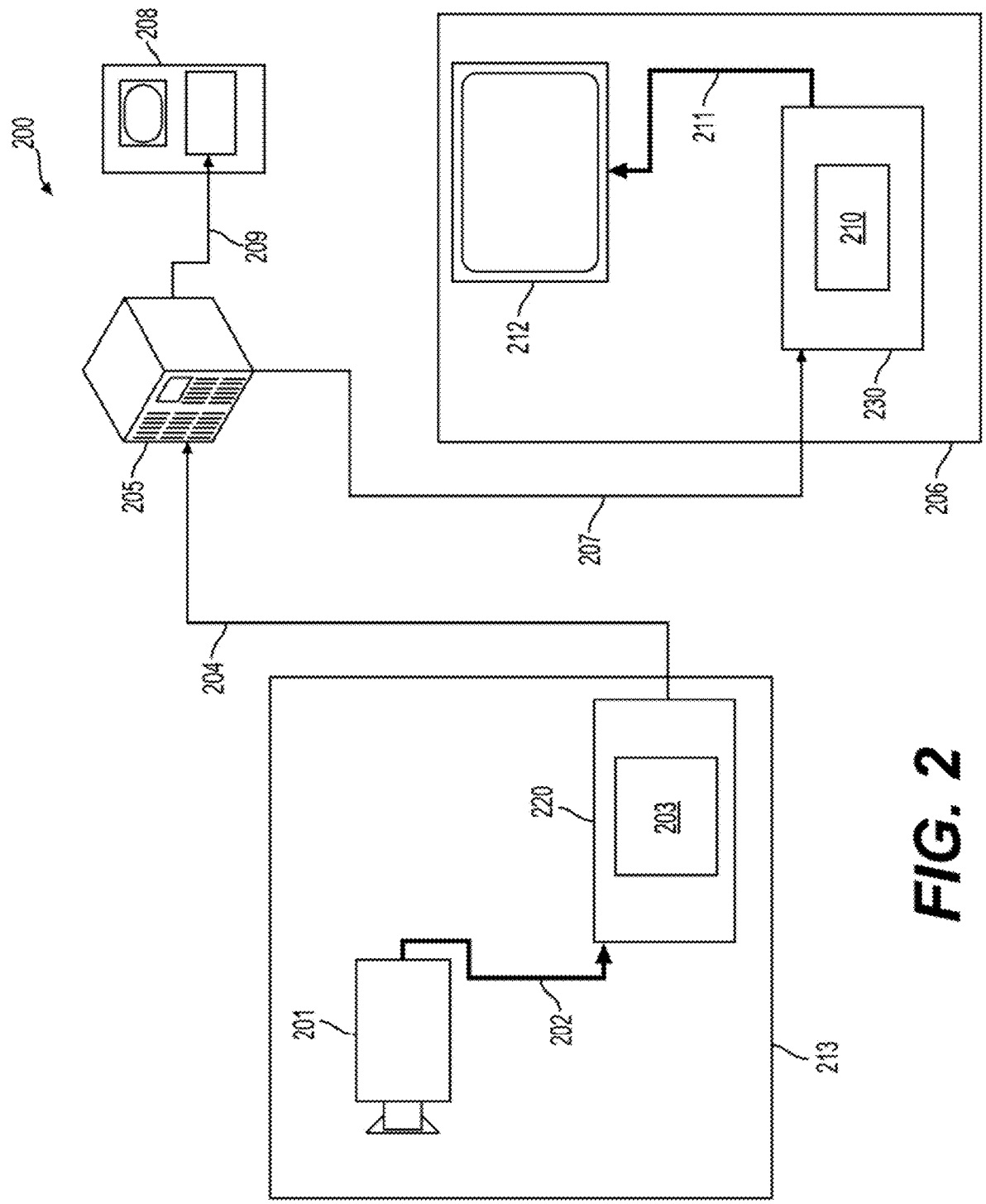
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
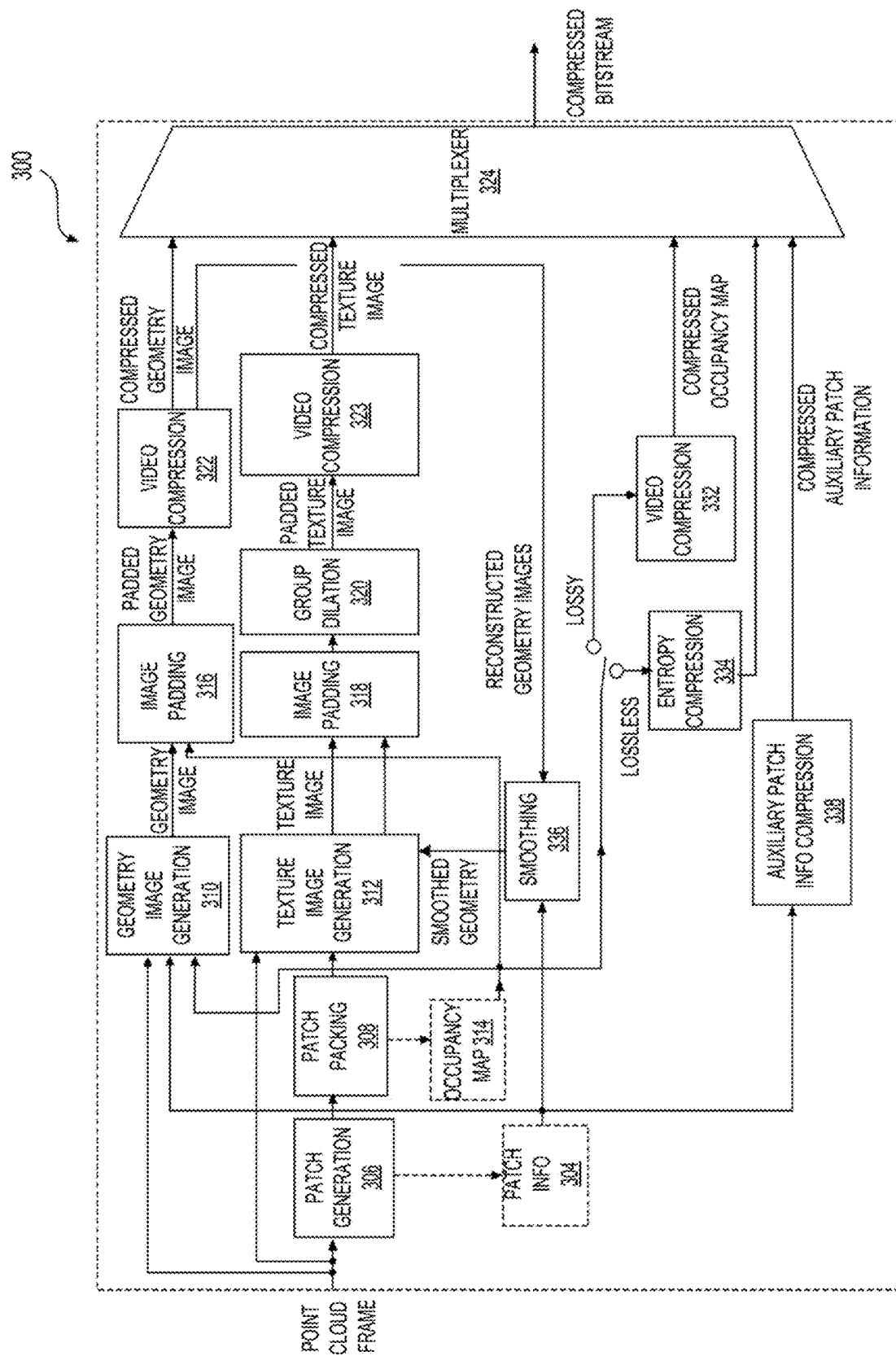
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
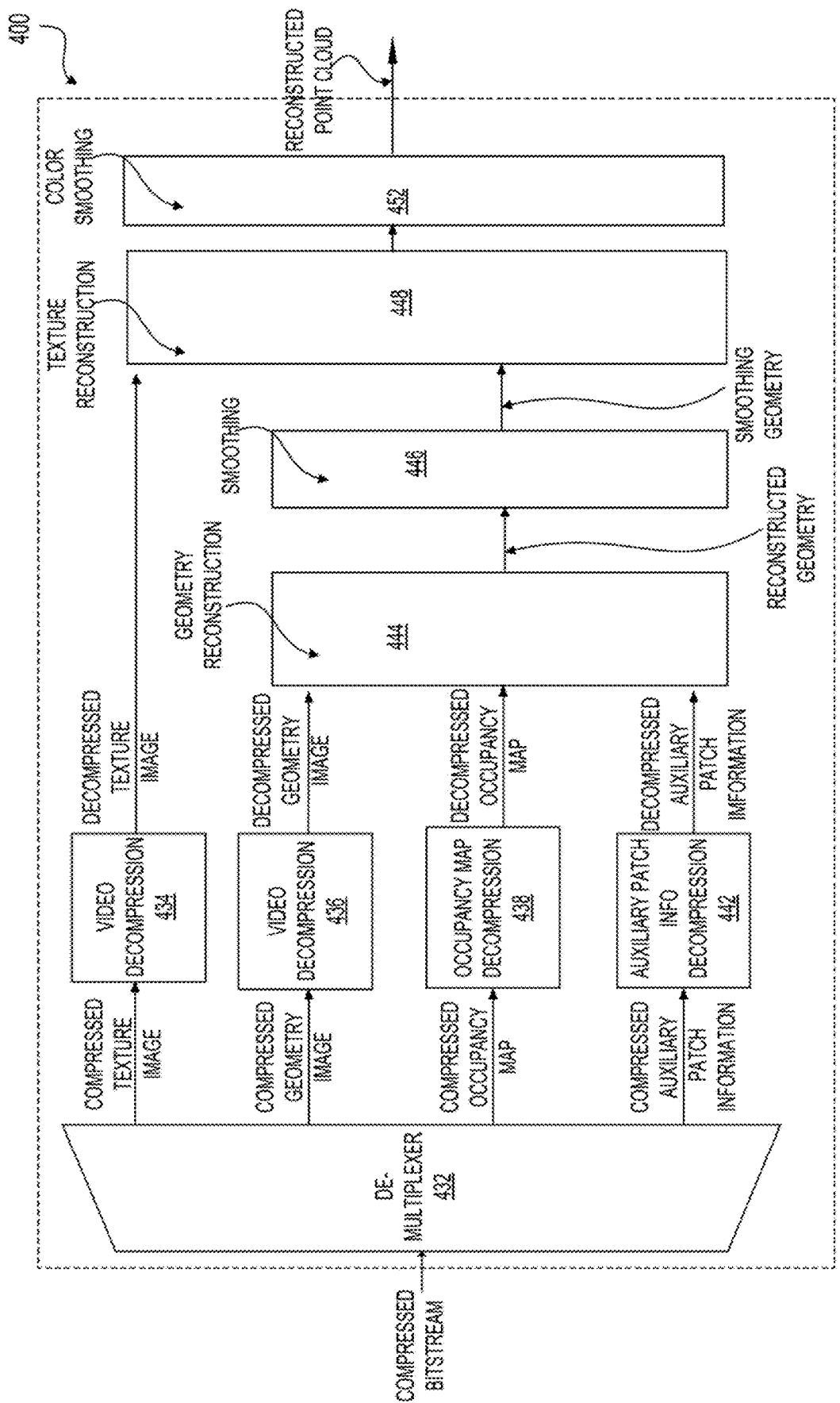
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
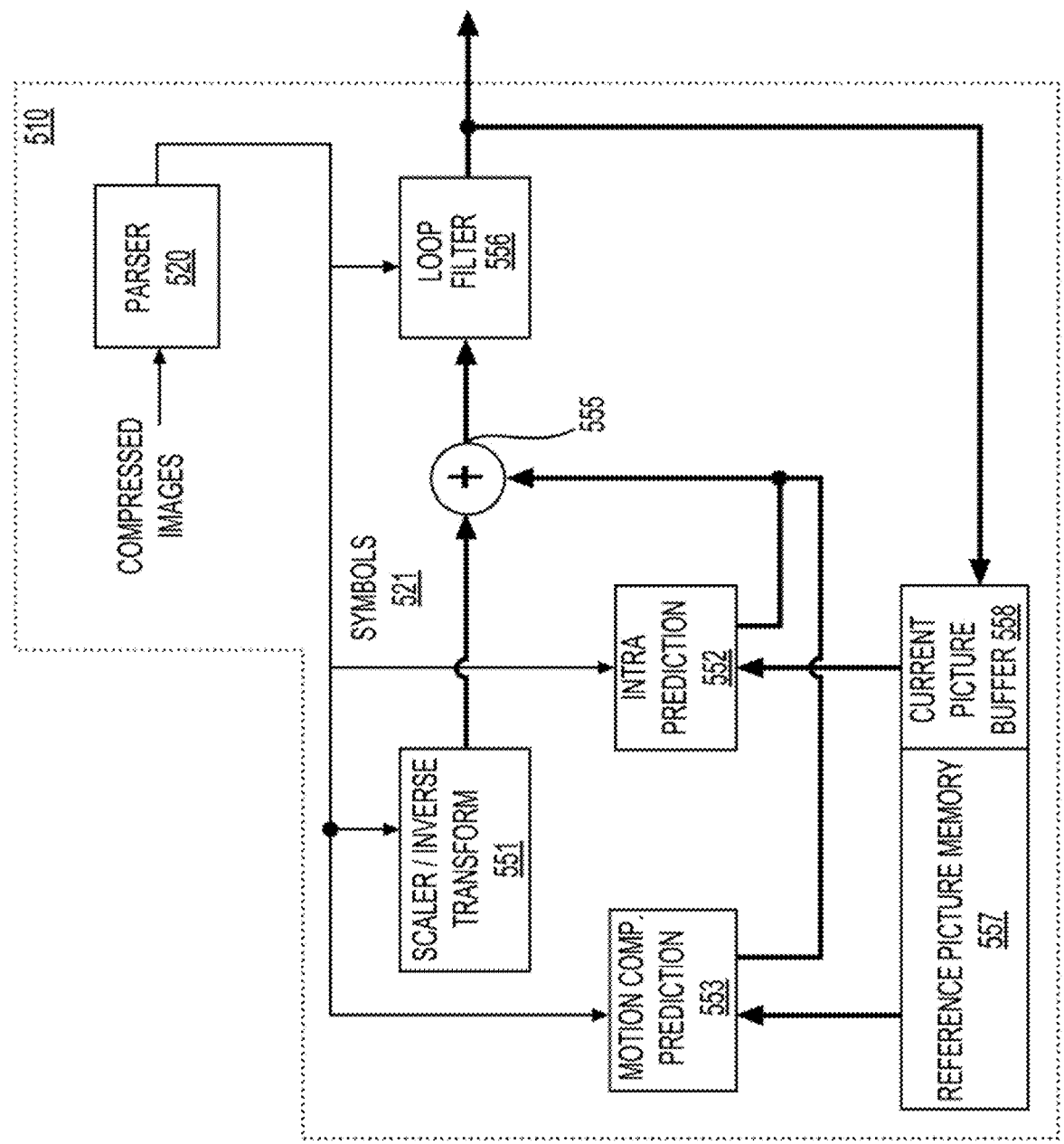
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
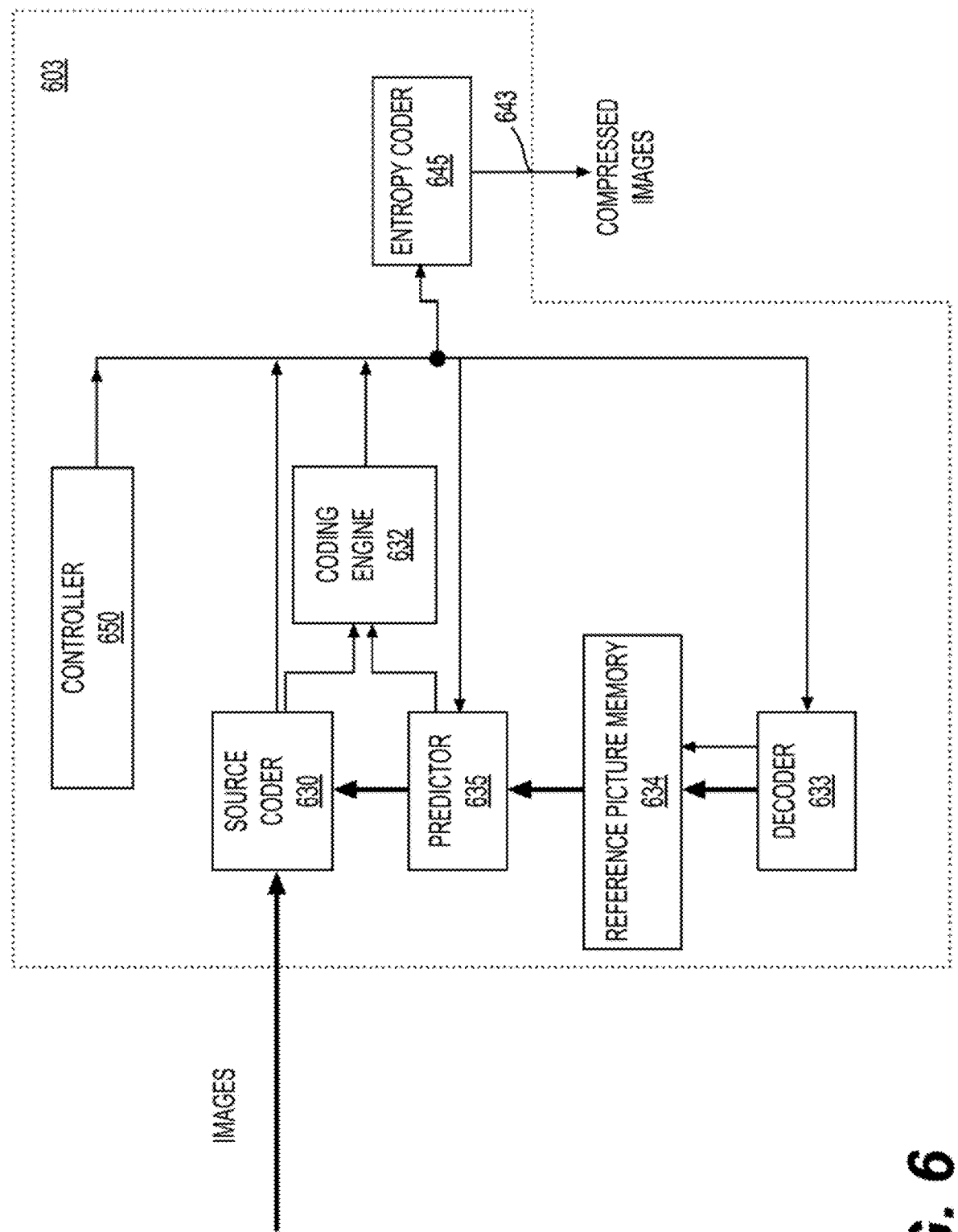
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
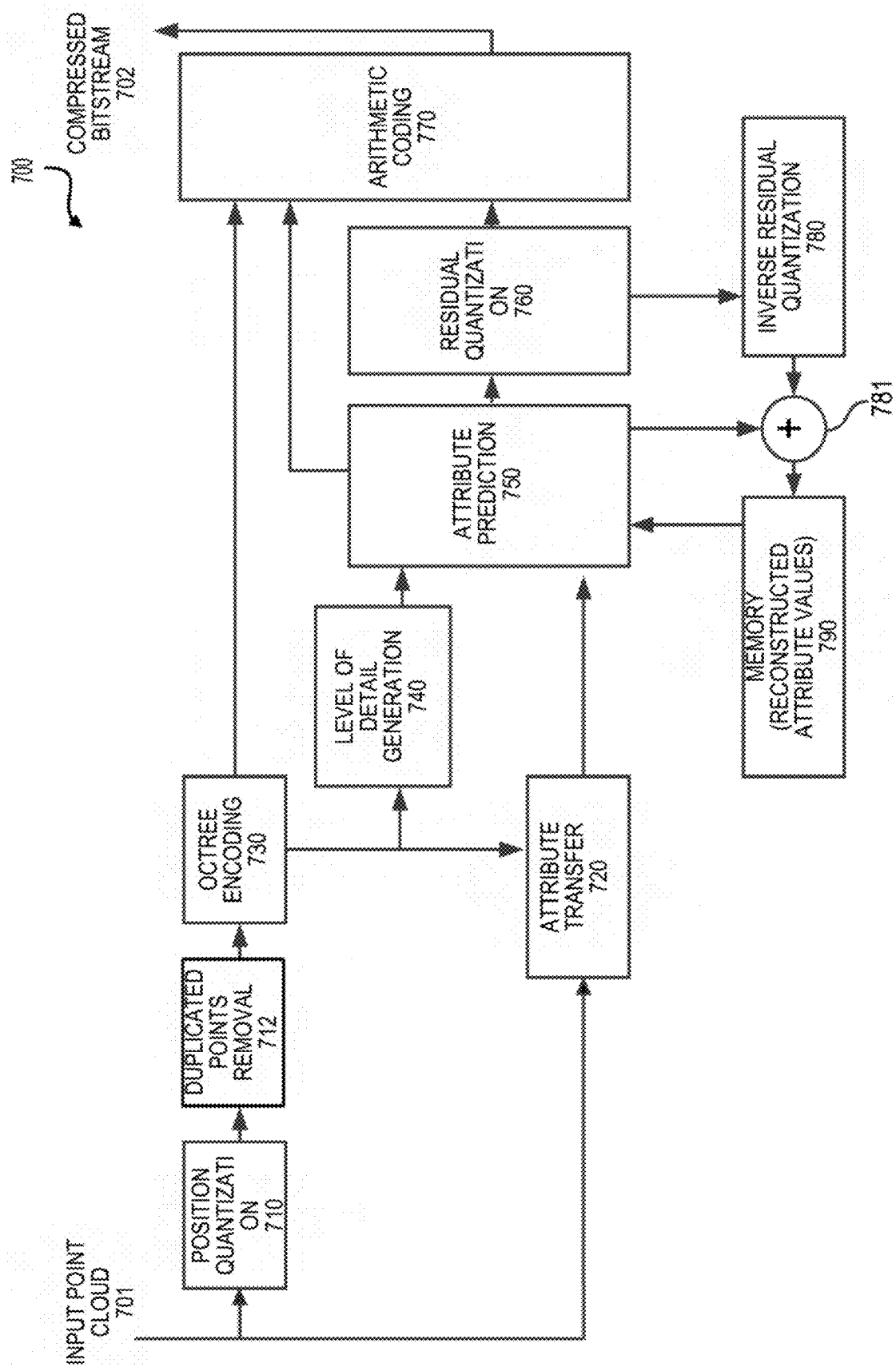
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
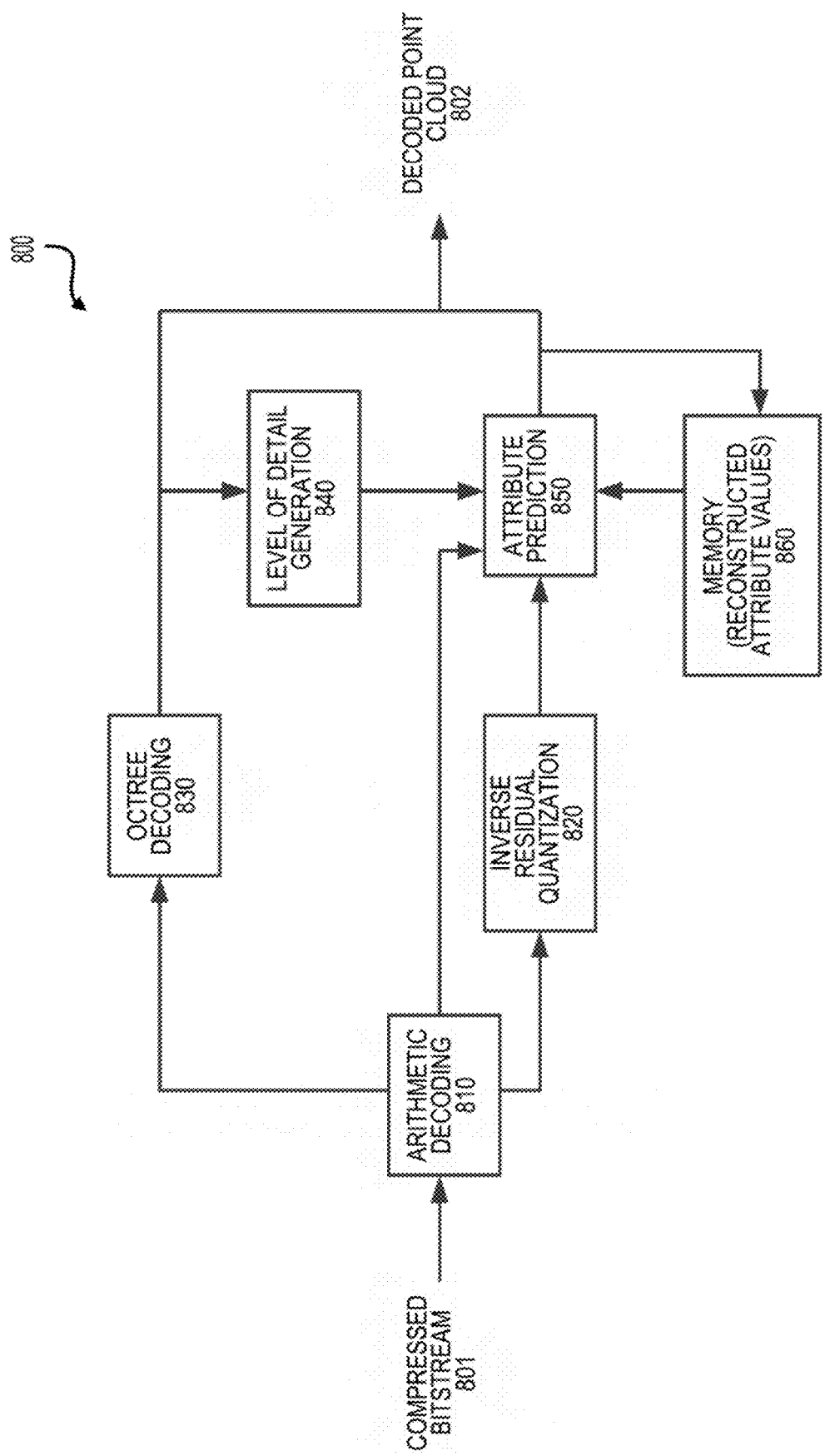
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordiantes. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples.

According to an aspect of the disclosure, the patches are parameterized respectively into 2D shapes (also referred to as UV patches) in some examples. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates.

According to some aspects of the disclosure, mesh compression can be performed by representing a mesh using one or more 2D maps (also referred to as 2D atlas in some examples), and then encoding the 2D maps using image or video codecs.

Figure 9:
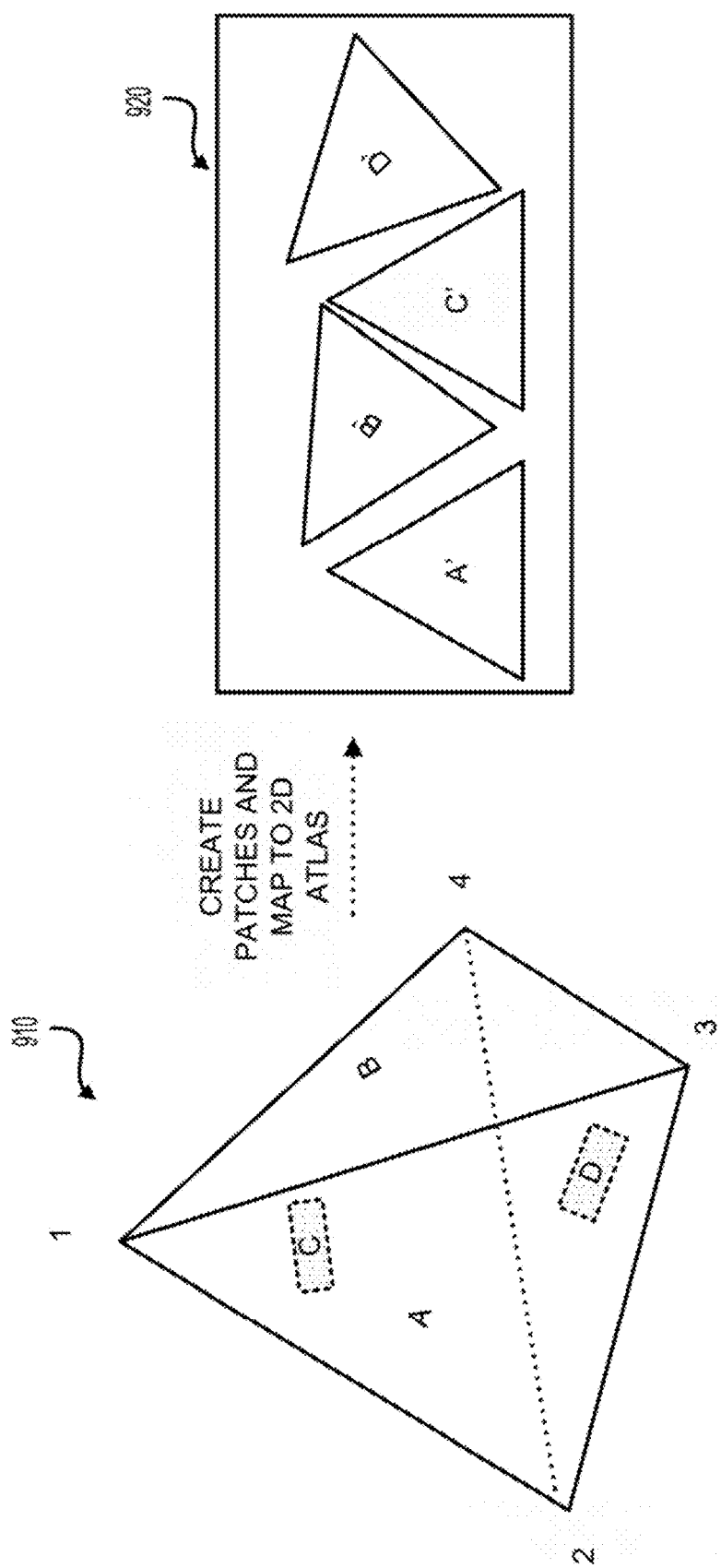
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as map (920). For example, the patch A is mapped to a 2D shape (also referred to as UV patch) A' in the map (920), the patch B is mapped to a 2D shape (also referred to as UV patch) B' in the map (920), the patch C is mapped to a 2D shape (also referred to as UV patch) C' in the map (920), and the patch D is mapped to a 2D shape (also referred to as UV patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinate in the map (920).

The map (920) can be geometry map with geometry information, or can be texture map with color, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a geometry map of 2D. For example, the geometry map stores the (x, y, z) coordinates of sampling points at a corresponding point in the 2D geometry map. For example, a point in the geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, the occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

Some techniques are used for mesh compression. In some examples, UV atlas sampling and V-PCC can be used for mesh compression. For example, the UV atlas is sampled on regular grids to generate a geometry image with regular grid samples. Connectivity of the regular grid samples can be inferred. The regular grid samples can be considered as points in a point cloud, and thus can be coded using PCC coded, such as V-PCC codec. The UV atlas sampling and V-PCC based methods are based on sampling the original mesh vertices, the number of regular grid samples generated by sampling are usually much more than the number of original vertices. Also, when a constant sampling step is used, the area of dense vertices may be under-sampled while the area of sparse vertices may be over-sampled. Further, for the UV atlas sampling method, the generated geometry images may not be consistent between frames as the patches in the UV atlas may be arranged differently in different frames.

Figure 10:
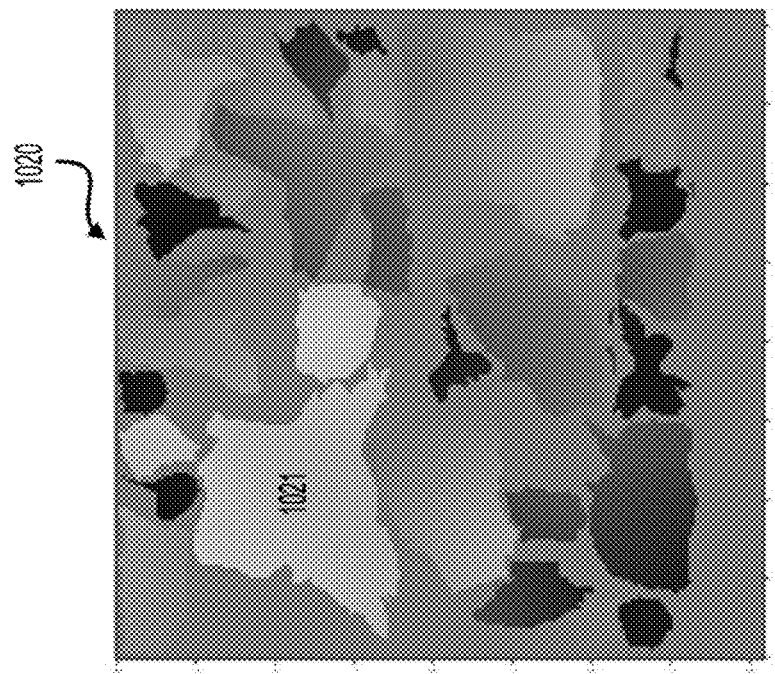
FIG. 10 shows two UV atlas frames in some examples.
Figure 10:
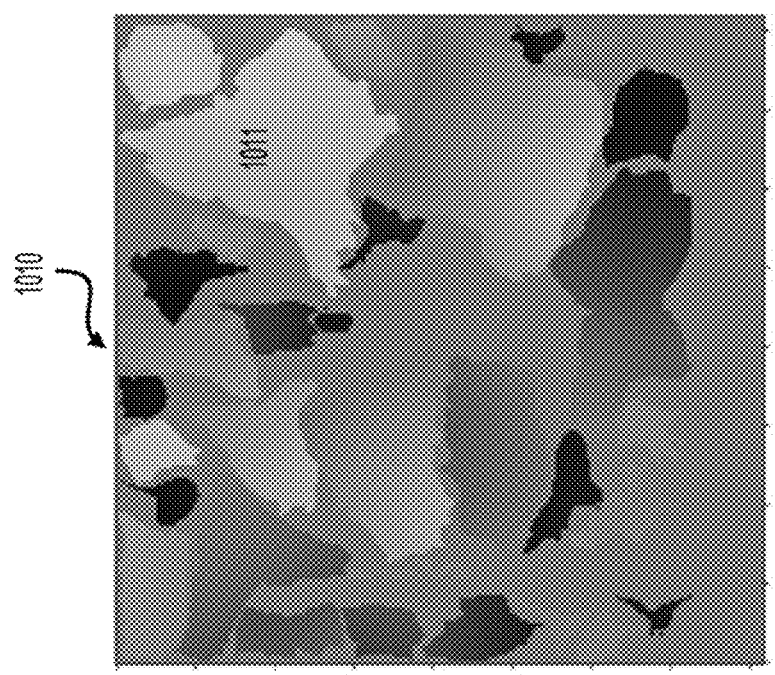

FIG. 10 shows two UV atlas frames (1010) and (1020) in some examples. In an example, the UV atlas frame (1010) and (1020) are consecutive frames in a sequence. As shown in FIG. 10, patches are allocated inconsistently between the different UV atlas frames. For example, a patch (1011) in the UV atlas frame (1010) and a patch (1021) in the UV atlas frame (1020) can correspond to a same portion of an object at different times, but are allocated to different regions in the UV atlas frame (1010) and the UV atlas frame (1020), and are oriented differently.

The UV atlas sampling based methods may cause issues, such as under-sampling, over-sampling, more vertices to compress, and inconsistent sampling data between frames. The issues can negatively affect the compression ratio.

Aspects of the disclosure provide vertex reordering techniques for mesh compression. The vertices of a mesh are reordered according to certain rules to increase correlations of neighboring vertices, thus predictive coding methods can be used to increase coding efficiency. In an example, the vertices are reordered to increase correlations of neighboring vertices in a sequence. In another example, vertices of a mesh are reordered and rearranged in a two-dimensional (2D) frame to increase correlations of neighboring vertices in local regions of the 2D frame, thus the 2D frame can be coded more efficiently by image/video codec, such as using intra prediction techniques. In another example, the vertices of different mesh frames are reordered and rearranged in 2D frames to increase correlations between 2D frames, thus the 2D frames can be coded more efficiently by video codec, such as using inter prediction techniques.

Figure 11:
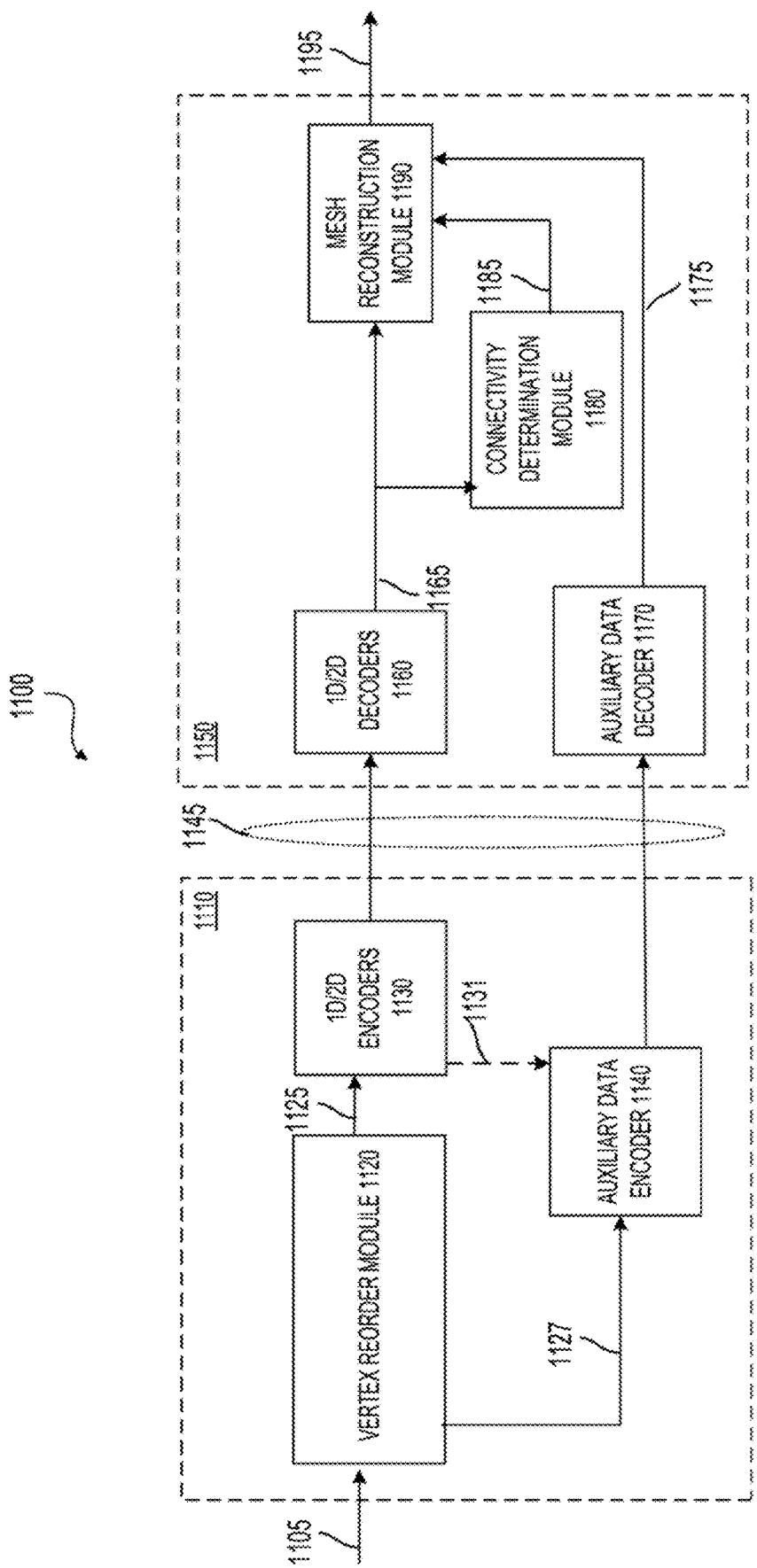
FIG. 11 shows a diagram of a framework for mesh compression according to some embodiments of the disclosure.

FIG. 11 shows a diagram of a framework (1100) for mesh compression according to some embodiments of the disclosure. The framework (1100) includes a mesh encoder (1110) and a mesh decoder (1150). The mesh encoder (1110) encodes an input mesh (1105) (a mesh frame in case of a dynamic mesh processing) into a bitstream (1145), and the mesh decoder (1150) decodes the bitstream (1145) to generate a reconstructed mesh (1195) (a reconstructed mesh frame in case of a dynamic mesh processing).

The mesh encoder (1110) can be any suitable device, such as a computer, a server computer, a desktop computer, a laptop computer, a tablet computer, a smart phone, a gaming device, an AR device, a VR device, and the like. The mesh decoder (1150) can be any suitable device, such as a computer, a client computer, a desktop computer, a laptop computer, a tablet computer, a smart phone, a gaming device, an AR device, a VR device, and the like. The bitstream (1145) can be transmitted from the mesh encoder (1110) to the mesh decoder (1150) via any suitable communication network (not shown).

In the FIG. 11 example, the mesh encoder (1110) includes a vertex reorder module (1120), 1D/2D encoders (1130), and an auxiliary data encoder (1140) coupled together. The vertex reorder module (1120) receives the input mesh (1105) and performs reordering to generate mesh information of reordered vertices (1125). In some examples, the input mesh (1105) includes 3D location information of vertices of a mesh in an original order, connectivity information of the vertices, mapping information that parameterizes the mesh to 2D (e.g., UV atlas), and other 2D attribute maps (e.g., 2D color map). The vertex reorder module (1120) can reorder and/or rearrange the vertices to increase attribute correlations of neighboring vertices (e.g., attribute correlation of neighboring vertices a sequence (e.g., 1D array), attribute correlations of neighboring vertices in an area in 2D array, attribute correlation of neighboring frames).

The vertex reorder module (1120) outputs the mesh information of reordered vertices (1125). In some examples, the mesh information of reordered vertices (1125) does not include connectivity information. In an example, the mesh information of reordered vertices (1125) includes vertex information of vertices in the reordered sequence. For example, vertex information for each vertex can include various attributes such as 3D spatial information in the mesh (e.g., xyz coordinates), mapping information to 2D (e.g., uv coordinates), color information (e.g., RGB values), and the like.

In another example, the mesh information of reordered vertices (1125) includes vertex information of vertices in the form of 2D images. For example, the reordered vertices are rearranged into samples (pixels) of 2D (e.g., based on raster scan line, and the like), and the mesh information of the reordered vertices can form one or more 2D images.

The 1D/2D encoders (1130) are configured to encode the mesh information of reordered vertices (1125) into the bitstream (1145). When the mesh information of reordered vertices (1125) includes the vertex information of vertices in the reordered sequence (1D), the 1D/2D encoders (1130) can encode the vertex information of vertices in the reordered sequence using 1D encoding techniques. When the mesh information of reordered vertices (1125) includes 2D images, the 1D/2D encoders (1130) can encode the 2D images using image encoding and/or video encoding techniques (e.g., using image codec or video codec).

The vertex reorder module (1120) also generates auxiliary data (1127) that includes assistance information. The auxiliary data encoder (1140) receives the auxiliary data (1127), and encodes the auxiliary data (1127) into the bitstream (1145). For example, the vertex reorder module (1120) can reorder the vertices patch by patch. The vertex reorder module (1120) can provide values indicating the number of vertices in each patch in the auxiliary data (1127). Further, in an example, the vertex reorder module (1120) can reorder, for each patch, boundary vertices in front of non-boundary vertices. The vertex reorder module (1120) can provide values indicating the number of boundary vertices in each patch in the auxiliary data (1127).

In some examples, the auxiliary data encoder (1140) can receive reconstructed information (1131) from the 1D/2D encoders (1130). In an example, a lossy compression is used in the 1D/2D encoders (1130). The 1D/2D encoders (1130) can provide reconstructed vertex information, such as reconstructed boundary coordinates and the like in the reconstructed information (1131). In an example, the auxiliary data encoder (1140) can determine boundary coordinate residuals based on original boundary coordinates and the reconstructed boundary coordinates, and encode the boundary coordinate residuals into the bitstream (1145).

The operations of the vertex reorder module (1120), the 1D/2D encoders (1130) and the auxiliary data encoder (1140) will be further described in the present disclosure.

In the FIG. 11 example, the bitstream (1145) is provided to the mesh decoder (1150). The mesh decoder (1150) includes 1D/2D decoders (1160), a connectivity determination module (1180), an auxiliary data decoder (1170), and a mesh reconstruction module (1190) coupled together as shown in FIG. 11. In an example, the 1D/2D decoders (1160) correspond the 1D/2D encoders (1130), and can decode a portion of the bitstream (1145) that is encoded by the 1D/2D encoder (1130) and generate decoded information (1165).

In the FIG. 11 example, the auxiliary data decoder (1170) corresponds the auxiliary data encoder (1140), and can decode a portion of the bitstream (1145) that is encoded by the auxiliary data encoder (1140) and generate decoded auxiliary data (1175).

In the FIG. 11 example, the connectivity determination module (1180) can determine (infer) connectivity information (1185) from the decoded information (1165).

In the FIG. 11 example, the decoded information (1165), the decoded auxiliary data (1175) and the connectivity information (1185) are provided to the mesh reconstruction module (1190). The mesh reconstruction module (1190) generates the reconstructed mesh (1195) based on the decoded information (1165), the decoded auxiliary data (1175) and the connectivity information (1185). The operations of the 1D/2D decoders (1160), the auxiliary data decoder (1170) and the connectivity determination module (1180) will be further described in the present disclosure.

It is noted that components in the mesh encoder (1110), such as the vertex reorder module (1120), the auxiliary data encoder (1140) and the 1D/2D encoders (1130) can be respectively implemented by various techniques. In an example, a component is implemented by integrated circuitry. In another example, a component is implemented using software that can be executed by one or more processors.

It is noted that components in the mesh decoder (1150), such as the 1D/2D decoders (1160), the auxiliary data decoder (1170), the connectivity determination module (1180), and the mesh reconstruction module (1190), can be respectively implemented by various techniques. In an example, a component is implemented by integrated circuitry. In another example, a component is implemented using software that can be executed by one or more processors.

Figure 12:
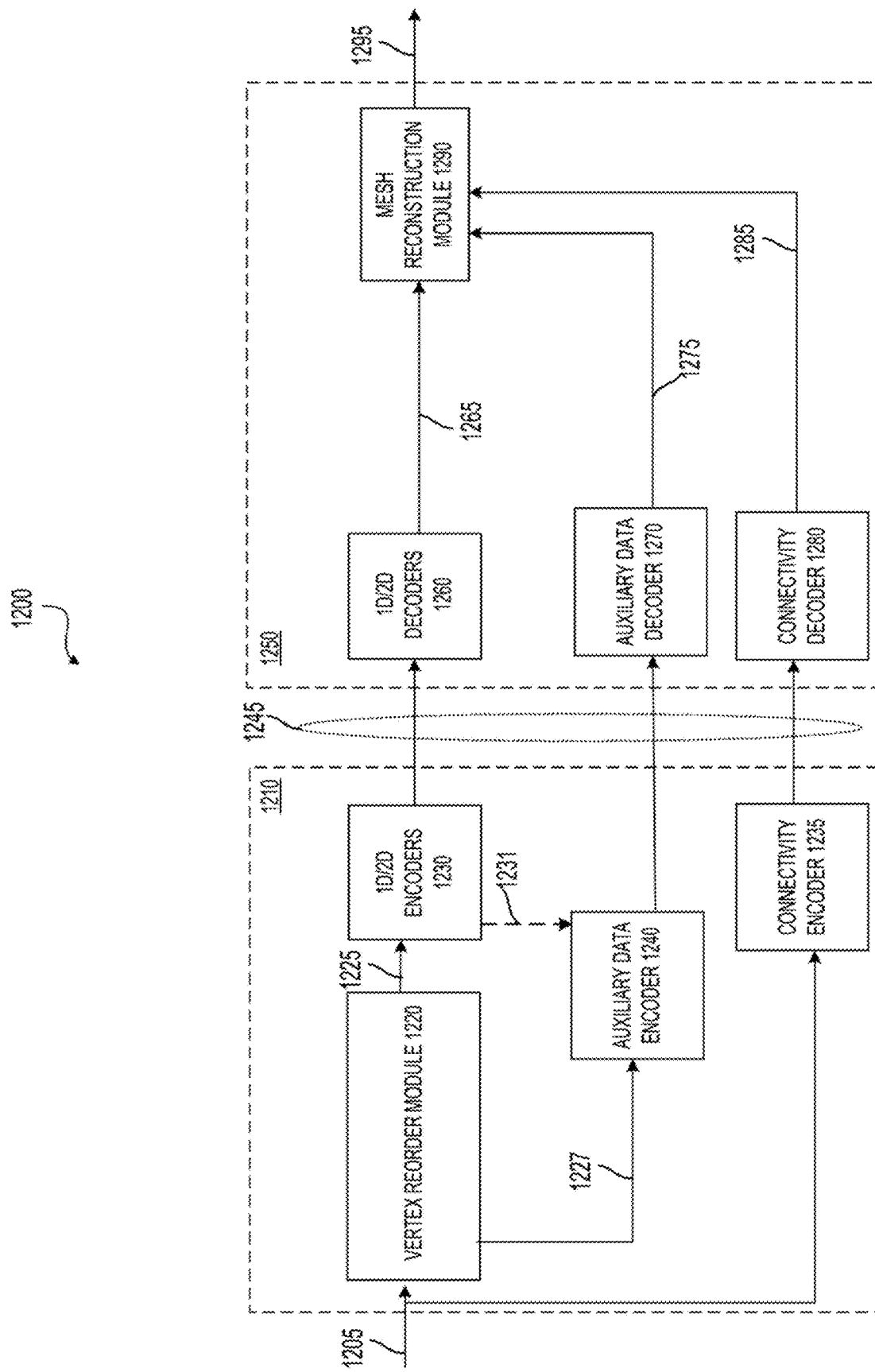
FIG. 12 shows a diagram of a framework for mesh compression according to some embodiments of the disclosure.

FIG. 12 shows a diagram of a framework (1200) for mesh compression according to some embodiments of the disclosure. The framework (1200) includes a mesh encoder (1210) and a mesh decoder (1250). The mesh encoder (1210) encodes an input mesh (1205) (a mesh frame in case of a dynamic mesh processing) into a bitstream (1245), and the mesh decoder (1250) decodes the bitstream (1245) to generate a reconstructed mesh (1295) (a reconstructed mesh frame in case of a dynamic mesh processing).

The mesh encoder (1210) can be any suitable device, such as a computer, a server computer, a desktop computer, a laptop computer, a tablet computer, a smart phone, a gaming device, an AR device, a VR device, and the like. The mesh decoder (1250) can be any suitable device, such as a computer, a client computer, a desktop computer, a laptop computer, a tablet computer, a smart phone, a gaming device, an AR device, a VR device, and the like. The bitstream (1245) can be transmitted from the mesh encoder (1210) to the mesh decoder (1250) via any suitable communication network (not shown).

In the FIG. 12 example, the mesh encoder (1210) includes a vertex reorder module (1220), 1D/2D encoders (1230), an auxiliary data encoder (1240) and a connectivity encoder (1235) coupled together. The vertex reorder module (1220) operates similarly to the vertex order module (1120). The vertex recorder module (1220) receives the input mesh (1205) and performs reordering to generate mesh information of reordered vertices (1225). In some examples, the input mesh (1205) includes 3D location information of vertices of a mesh in an original order, connectivity information of the vertices, mapping information that parameterizes the mesh to 2D (e.g., UV atlas), and 2D attribute maps. The vertex reorder module (1220) can reorder and/or rearrange the vertices to increase correlations of neighboring vertices (e.g., sequential neighboring correlation, spatial neighboring correlation, temporal neighboring correlation).

The vertex reorder module (1220) outputs the mesh information of reordered vertices (1225). In some examples, the mesh information of reordered vertices (1225) does not include connectivity information. In an example, the mesh information of reordered vertices (1225) includes vertex information of vertices in the reordered sequence. For example, vertex information for each vertex can include various attributes such as 3D spatial information in the mesh (e.g., xyz coordinates), mapping information to 2D (e.g., uv coordinates), color information (e.g., RGB values), and the like.

In another example, the mesh information of reordered vertices (1225) includes vertex information of vertices in the form of 2D images. For example, the reordered vertices are rearranged into samples (pixels) of 2D, and the mesh information of the reordered vertices can form one or more 2D images.

The 1D/2D encoders (1230) are configured to encode the mesh information of reordered vertices (1225) into the bitstream (1245). When the mesh information of reordered vertices (1225) includes the vertex information of vertices in the reordered sequence (1D), the 1D/2D encoders (1230) can encode the vertex information of vertices in the reordered sequence using 1D encoding techniques. When the mesh information of reordered vertices (1225) includes 2D images, the 1D/2D encoders (1230) can encode the 2D images using image encoding and/or video encoding techniques (e.g., using image codec or video codec).

Further, in the FIG. 12 example, the connectivity encoder (1235) can encode the connectivity information in the input mesh (1205) into the bitstream (1245). The connectivity encoder (1235) can use any suitable techniques to encode the connectivity information.

The vertex reorder module (1220) also generates auxiliary data (1227) that includes assistance information. The auxiliary data encoder (1240) receives the auxiliary data (1227), and encodes the auxiliary data (1227) into the bitstream (1245). For example, the vertex reorder module (1220) can reorder the vertices patch by patch. The vertex reorder module (1220) can provide values indicating the number of vertices in each patch in the auxiliary data (1227). Further, in an example, the vertex reorder module (1220) can reorder, for each patch, boundary vertices in front of non-boundary vertices. The vertex reorder module (1220) can provide values indicating the number of boundary vertices in each patch in the auxiliary data (1227).

In some examples, the auxiliary data encoder (1240) can receive reconstructed information (1231) from the 1D/2D encoders (1230). In an example, a lossy compression is used in the 1D/2D encoders (1230). The 1D/2D encoders (1230) can provide reconstructed vertex information, such as reconstructed boundary coordinates and the like in the reconstructed information (1231). In an example, the auxiliary data encoder (1240) can determine boundary coordinate residuals based on original boundary coordinates and the reconstructed boundary coordinates, and encode the boundary coordinate residuals into the bitstream (1245).

The operations of the vertex reorder module (1220), the auxiliary data encoder (1240) and the 1D/2D encoders (1230) are similar to the operations of the vertex reorder module (1120), the auxiliary data encoder (1140) and the 1D/2D encoders (1130) and will be further described in the present disclosure.

In the FIG. 12 example, the bitstream (1245) is provided to the mesh decoder (1250). The mesh decoder (1250) includes 1D/2D decoders (1260), an auxiliary data decoder (1270), a connectivity decoder (1280), and a mesh reconstruction module (1290) coupled together as shown in FIG. 12. In an example, the 1D/2D decoders (1260) correspond the 1D/2D encoders (1230), and can decode a portion of the bitstream (1245) that is encoded by the 1D/2D encoder (1230) and generate decoded information (1265).

In the FIG. 12 example, the auxiliary data decoder (1270) corresponds the auxiliary data encoder (1240), and can decode a portion of the bitstream (1245) that is encoded by the auxiliary data encoder (1240) and generate decoded auxiliary data (1275).

In the FIG. 12 example, the connectivity decoder (1280) corresponds the connectivity encoder (1235), and can decode a portion of the bitstream (1245) that is encoded by the connectivity encoder (1235) and generate decoded connectivity (1285).

In the FIG. 12 example, the decoded information (1265), the decoded auxiliary data (1275) and the decoded connectivity (1285) are provided to the mesh reconstruction module (1290). The mesh reconstruction module (1290) generates the reconstructed mesh (1295) based on the decoded information (1265), the decoded auxiliary data (1275) and the decoded connectivity (1285). The operations of the 1D/2D decoders (1260) and the connectivity decoder (1280) will be further described in the present disclosure.

It is noted that components in the mesh encoder (1210), such as the vertex reorder module (1220), the auxiliary data encoder (1240), the 1D/2D encoders (1230) and the connectivity encoder (1235) can be respectively implemented by various techniques. In an example, a component is implemented by integrated circuitry. In another example, a component is implemented using software that can be executed by one or more processors.

It is noted that components in the mesh decoder (1250), such as the 1D/2D decoders (1260), the auxiliary data decoder (1270), the connectivity decoder (1280), and the mesh reconstruction module (1290), can be respectively implemented by various techniques. In an example, a component is implemented by integrated circuitry. In another example, a component is implemented using software that can be executed by one or more processors.

According to some aspects of the disclosure, vertices of a mesh can be reordered patch by patch based on spatial properties of the vertices in the mesh.

Figure 13:
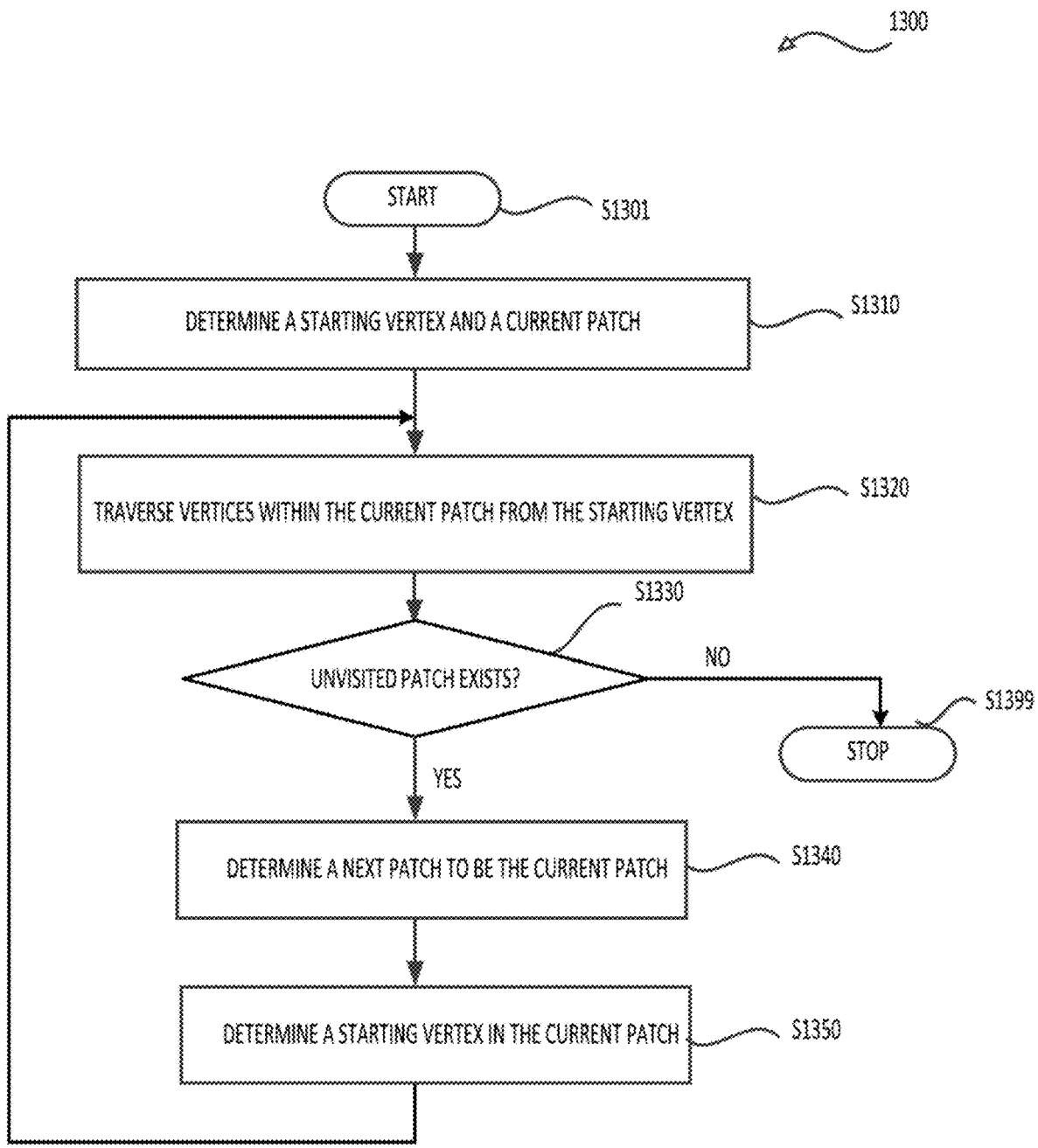
FIG. 13 shows a flow chart outlining a process for reordering vertices in a mesh according to some embodiments of the disclosure.

FIG. 13 shows a flow chart outlining a process (1300) for reordering vertices in a mesh (a mesh frame for dynamic mesh processing) according to some embodiments of the disclosure. In some examples, the process (1300) is performed by a vertex reorder module, such as vertex reorder module (1120), vertex reorder module (1220), and the like. In various embodiments, the process (1300) is executed by processing circuitry. In some embodiments, the process (1300) is implemented in software instructions, thus when the processing circuitry executes the software instructions, the processing circuitry performs the process (1300). The process (1300) starts at (S1301) and proceeds to (S1310).

At (S1310), a starting vertex in the mesh is determined and a current patch that includes the starting vertex is determined. In some examples, a mesh includes a plurality of vertices, and the vertices can be connected by edges. In some examples, the mesh includes triangles formed by the edges. Two triangles are connected if the two triangles share an edge. The mesh is partitioned into patches in the 3D domain. A patch is a contiguous subset of the mesh with connected triangles. In an example, when an edge in a patch is not shared by two adjacent triangles of the patch, for example the edge belongs to only one triangle of the patch, the edge is a boundary edge of the patch, and the vertices of the boundary edges are boundary vertices. The vertices in a patch can be categorized into boundary vertices and non-boundary vertices.

In some embodiments, vertex attributes with certain spatial property are used to select the starting vertex, such that the vertex traversal starts at almost the same location for each frame in a group of mesh frames in a dynamic mesh.

In an example, the group of mesh frames is of similar concept as a group of pictures (GOP) in 2D.

In some examples, the starting vertex is selected based on coordinates in 3D. In an example, the vertex with the largest vertical coordinate (e.g., largest z coordinate) is selected as the starting vertex, so that the starting vertex is the highest vertex. It is noted that other attributes, such as Gaussian curvature, local vertex density, color information, and the like can be used to select the starting vertex.

After the starting vertex is selected, the corresponding patch that includes the starting vertex is determined as the first patch to be processed. Thus, the first patch is the current patch for processing, and the starting vertex is also the starting vertex of the current patch.

At (S1320), vertices in the current patch are traversed starting from the starting vertex of the current patch. The vertices in the current patch can be traversed by various techniques. In an example, a breadth-first search can be performed for traversal. In another example, a depth-first search can be performed for traversal. In another example, boundary vertices of the current patch are traversed first and interior vertices (also referred to non-boundary vertices) of the current patch are traversed afterwards. Thus, the boundary vertices are better grouped together. In some examples, while lossy compression is used for encoding attributes of the vertices, additional processing can be applied to the boundary vertices, thus the coordinates of the boundary vertices can be compressed without information loss (e.g., lossless compression).

At (S1330), when unvisited (vertices traversal has not been performed) patch exists, the process proceeds to (S1340); otherwise, all patches have been processed (traversed), and the process proceeds to (S1399), and terminates.

At (S1340), a next patch for traversal after the current patch (e.g., old current patch with vertices traversed) is determined, and the determined next patch is set to be the current patch (e.g., new current patch for further traversal processing) for processing. For example, after traversing all vertices in the first patch, a next patch for traversal after the first patch is determined. Various techniques can be used to determine the next patch. In an example, the next patch is selected as a patch that includes the highest vertex in the unvisited vertices (vertex traversal has not been performed). For example, when the first patch is chosen as the one containing the highest vertex, then the next patch to the first patch can be determined as the one containing the vertex with the largest vertical coordinate among the unvisited vertices.

In some examples, a patch that is closest (e.g., with a smallest distance) to the current patch (e.g., old current patch with vertices traversed) is selected as the next patch for traversal. The distance between the current patch (e.g., old current patch with vertices traversed) and another patch can be defined by various techniques. In an example, for an unvisited patch, a 3D Euclidean distance between each vertex in the unvisited vertex and the last visited vertex in the current patch (e.g., old current patch with vertices traversed) is calculated. Then, among the 3D Euclidean distances, the smallest 3D Euclidean distance is determined as the distance between the current patch (old current patch) and the unvisited patch.

In another example, average 3D coordinates (average x coordinate, average y coordinate, average z coordinate) of all vertices in an unvisited patch are calculated. Then, a 3D Euclidean distance between a point of the average 3D coordinates of the unvisited patch and the last visited vertex in the current patch (e.g., old current patch) is calculated and defined to be the distance between the current patch (old current patch) and the unvisited patch.

In another example, first average 3D coordinates (average x coordinate, average y coordinate, average z coordinate) of all vertices in the current patch (e.g., old current patch) are calculated, and second average 3D coordinates (average x coordinate, average y coordinate, average z coordinate) of all vertices in an unvisited patch are calculated. Then, a distance between a firs point having the first average 3D coordinates and a second point having the second average 3D coordinates is calculated and defined to be the distance between the current patch and the unvisited patch.

At (S1350), a starting vertex in the current patch (e.g., new current patch) to traverse is determined. Various techniques can be used to select the starting vertex to traverse in the current patch (e.g., new current patch). In an example, a highest vertex (e.g., with the largest z coordinate) within the current patch (e.g., new current patch) is selected as the starting vertex. In another example, a vertex that is the closest vertex in the current patch (e.g., new current patch) to the last visited vertex (in the old current patch) is selected as the starting vertex in the current patch. In another example, a highest boundary vertex in the current patch (e.g., new current patch) is selected as the starting vertex, and boundary vertices in the current patch (e.g., new current patch) are to be traversed before internal vertices (e.g., non-boundary vertices) in the current patch (e.g., new current patch). In another example, a boundary vertex that is the closest boundary vertex (in the new current patch) to the last visited vertex (in the old current patch) is selected to be the starting vertex, and boundary vertices in the current patch (e.g., new current patch) are to be traversed before internal vertices (e.g., non-boundary vertices) in the current patch (e.g., new current patch). Then, the process (S1300) returns to (S1320).

According to an aspect of the disclosure, after the vertices in the mesh are traversed for example according to the process (1300), vertex's attribute information, such as xyz coordinates (also referred to as 3D coordinates), uv coordinates, RGB colors, normals, and the like of the vertices in the mesh are recorded for example in the reordered mesh information (1125) or the reordered mesh information (1225) according to the traverse order. In some examples, after each patch is visited, the number of vertices in the patch and the number boundary vertices in the patch are recorded, for example in the auxiliary data (1127), the auxiliary data (1227), and the like.

In some examples, the reordered mesh information (1125) or the reordered mesh information (1225) include attribute arrays for vertices, such as an array of xyz coordinates, an array of uv coordinates, an array of other attributes (e.g., normal, colors, and the like). In an example, the attribute arrays of the vertices are 1D arrays in the traverse order of the vertices. The 1D arrays can be encoded by the 1D/2D encoders (1130) or the 1D/2D encoders (1230).

In another example, the vertices in the traverse order can be re-arranged into 2D form, such as according to a raster scan line pattern. Then, attributes of the vertices can be re-arranged into 2D images according to the re-arranged 2D form. In some examples of multiple mesh frames (e.g., dynamic mesh compression), after mesh frames in a sequence or a group of mesh frames are visited, the numbers of vertices in the frames (in the sequence or in the group) can be determined. Then, a maximum number of vertices is determined from the numbers of vertices in the mesh frames. Based on the maximum number of vertices, a width (denoted by m) and a height (denoted by n) of a 2D image can be determined. In an example, the width is the number of pixels in the horizontal direction, and the height is the number of pixels in the vertical direction, and a multiplication of the width and the height is equal or larger than the maximum number of vertices for the group of mesh frames. For each mesh frame, when the number of vertices of the mesh frame is smaller than the multiplication of the width (m) and the height (n), padding vertices (with padding attribute values) can be suitably added.

According to an aspect of the disclosure, the attributes, such as xyz coordinates, uv coordinates, normals, colors of vertices in each mesh frame are reshaped into m×n 2D images. Thus, the attributes of mesh frames, such as xyz coordinates, uv coordinates, and the like are stored in 2D images of the same size, and 2D video codec can be used to encode the 2D images. For example, xyz coordinates of vertices in a mesh frame can be reshaped into m×n×3 2D image (3 channels); uv coordinates of vertices in a mesh frame can be reshaped into m×n×2 2D image (2 channels).

In an example, xyz coordinates of vertices in mesh frames can be stored as color components in 2D images, such as using RGB 4:4:4 color format. In another example, uv coordinates of vertices in mesh frames can be split and stored into two groups of 2D images of 1 channel, such as using 4:0:0 color format. For example, u coordinates of vertices in mesh frames are stored into a first group of 2D images of 1 channel, and v coordinates of vertices in mesh frames are stored into a second group of 2D images of 1 channel.

In another example, a transform function (e.g., 2-tap Haar transform) can be applied to 2D images with uv coordinates to de-correlate the two channels. Then, the de-correlated 2D images of two channels can be split into two groups of 2D images of 1 channel. The two groups of 2D images can be encoded separately.

In another example, the uv coordinates of vertices in mesh frames can be stored as color components (three channels) in 2D images, such as using RGB 4:4:4 format. For example, u coordinates can be stored as the first channel, v coordinates can be stored as the second channel, and the third channel can be filled by arbitrary numbers, and the third channel can be discarded on the decoder side.

In some examples, lossy compression is used in encoders, such as the 1D/2D encoders (1130) and 1D/2D encoders (1230), to encode vertex attributes of a mesh. In order to keep more information of the boundary vertices of the mesh (e.g., to avoid gaps between patches), reconstructed coordinates (e.g., xyz coordinates, uv coordinates) of the boundary vertices (e.g., in the reconstructed information (1131), the reconstructed information (1231)) can be determined from the encoded vertex attributes, and differences between the original vertex coordinates and the reconstructed coordinates of the boundary vertices can be calculated. The differences between the original vertex coordinates and the reconstructed coordinates of the boundary vertices are denoted as boundary coordinate residuals. The boundary coordinate residuals can be coded into the bitstream that carries the mesh, such as the bitstream (1145), the bitstream (1245), and the like, for example by the auxiliary data encoder (1140), the auxiliary data encoder (1240), and the like.

According to some aspects of the disclosure, a bitstream that carries a 3D mesh (e.g., the bitstream (1145), the bitstream (1245)) includes vertex attributes, such as xyz coordinates, uv coordinates, and the like in the form of 1D array or 2D images, and includes auxiliary data to assist the correctly decoding and reconstructing of the 3D mesh.

In some examples, for each mesh frame, the attributes, such as xyz coordinates, uv coordinates and the like can be decoded from the bitstream by a 2D video codec or from other compressed formats, such as using the 1D/2D decoders (1160), the 1D/2D decoders (1260), and the like. For example, each pixel of a 2D frame output from a 2D video decoder represents a vertex's attribute such as xyz coordinates, uv coordinates, RGB color or normal. In an example, a 4:4:4 picture format can be used to represent the xyz coordinates of all vertices in a mesh frame; and two 1-channel 4:0:0 format pictures can be used to represent the uv coordinates of all vertices in the mesh frame.

In some examples, auxiliary data is decoded from the bitstream, for example by the auxiliary data decoder (1170), the auxiliar data decoder (1270), and the like. In an example, the auxiliary data includes the number of vertices and the number of boundary vertices in each patch. In another example, auxiliary data includes the number of vertices and the number of boundary vertices in each patch and includes boundary coordinate residuals.

In some examples, based on the number of vertices and the number of boundary vertices in each patch, the decoded vertices of a mesh frame can be grouped patch by patch. In general, the coded vertices in a picture are arranged patch by patch, or in any order that the decoder can recover. Then, for each mesh frame, mesh reconstruction can be performed patch by patch.

According to an aspect of the disclosure, for a patch, according to the number of vertices and the number of boundary vertices in the patch, boundary vertices in the patch can be identified, xyz coordinates and uv coordinates of vertices in the patch can be determined from the decoded information, for example output from the 1D/2D decoders (1160), the 1D/2D decoders (1260), and the like. In an example, both the encoder side and the decoder side agree that all boundary vertices are placed in front of all other inner-patch vertices (e.g., non-boundary vertices) for each patch. Therefore, the boundary vertices of each patch can be identified in all decoded vertices of the patch.

In some examples of using lossy compression, the boundary coordinate residuals are decoded (e.g., by the auxiliary data decoder (1170), by the auxiliary data decoder (1270)) and added (which are the differences between the original coordinate and the decoded coordinate) to the decoded boundary coordinates to obtain original xyz coordinates and uv coordinates of boundary vertices, for example by the mesh reconstruction module (1190), the mesh reconstruction module (1290), and the like.

In some examples, for lossy compression, the duplicated vertices with same xyz or uv coordinates may exist in the decoded information, and the duplication vertices are removed. Further, in some examples, some decoded vertices corresponding to the interior vertices (original interior vertices in the original mesh) of the patch may be out of the patch (e.g., outside a boundary formed by the boundary edges of the patch) due to lossy compression, and the decoded vertices that are out of the patch can be removed.

In some examples, to obtain the connectivity, the uv coordinates of all vertices of the patch and the boundary vertices of the patch are used to perform a triangulation operation, such as the constrained Delaunay triangulation, and the like to obtain (infer) the connectivity of the patch. In some other examples, the connectivity information of each patch can be explicitly signaled in the bitstream, such that the decoder side can reconstruct the topologies of the meshes directly without any triangulation algorithm.

Figure 14:
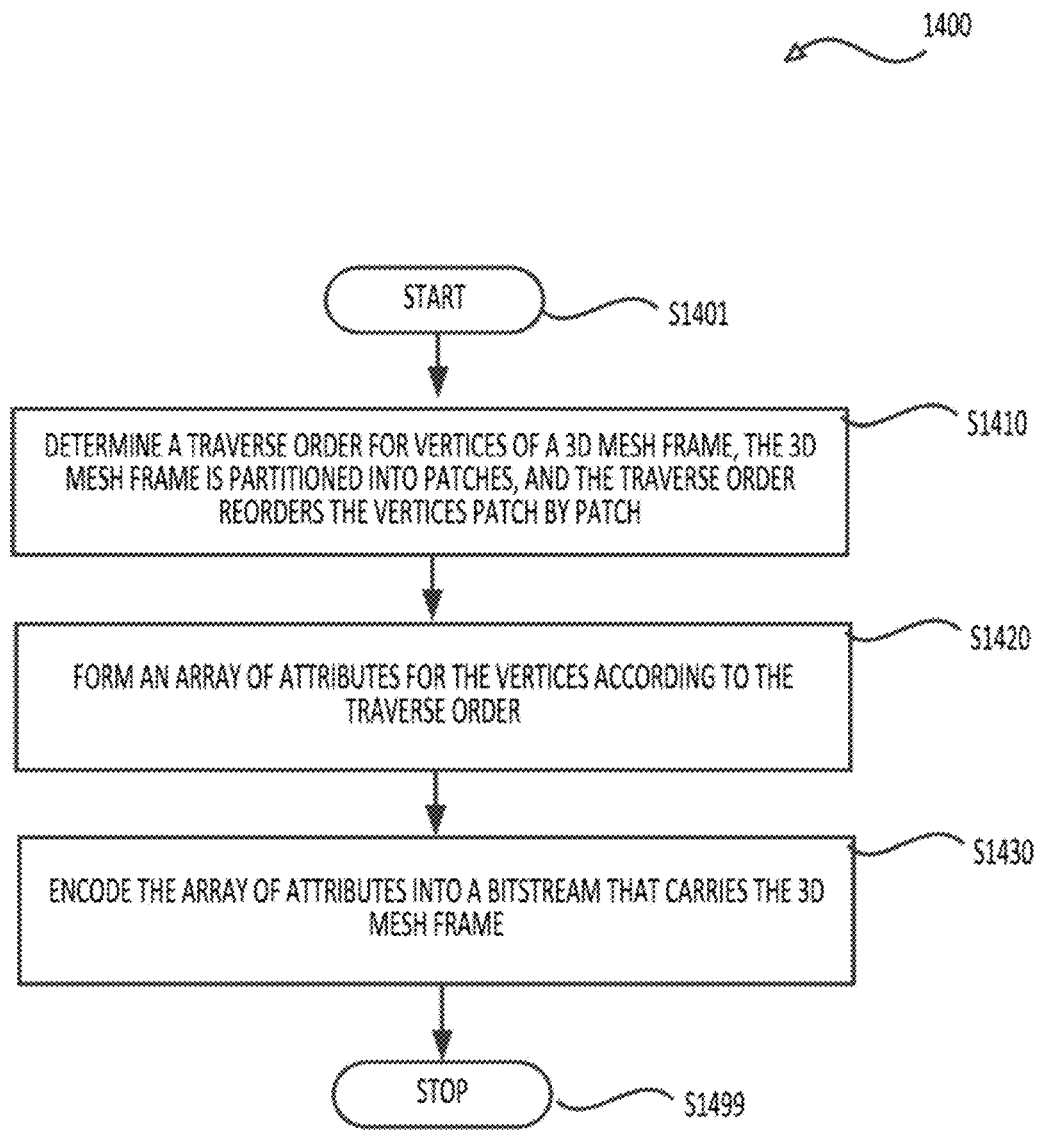
FIG. 14 shows a flow chart outlining a process example in some examples.

FIG. 14 shows a flow chart outlining a process (1400) according to an embodiment of the disclosure. The process (1400) can be used during an encoding process for a mesh. In various embodiments, the process (1400) is executed by processing circuitry. In some embodiments, the process (1400) is implemented in software instructions, thus when the processing circuitry executes the software instructions, the processing circuitry performs the process (1400). The process starts at (S1401) and proceeds to (S1410).

At (S1410), a traverse order for vertices of a 3D mesh frame is determined. The 3D mesh frame is partitioned into patches, the traverse order reorders the vertices patch by patch. For example, the vertices are ordered into subsets respectively belong to the patches.

At (S1420), an array of attributes for the vertices is formed according to the traverse order of the vertices of the 3D mesh frame.

At (S1430), the array of attributes is encoded into a bitstream that carries the 3D mesh frame.

To determine the traverse order, in some embodiments, a starting vertex is determined from the vertices of the 3D mesh frame, and a first patch of a first subset of the vertices is determined. The starting vertex is a vertex in the first subset of the vertices. In some examples, the starting vertex is determined according to a spatial property of the 3D mesh frame that maintains over a sequence of 3D mesh frames. Thus, the starting vertex for each 3D mesh frame in the sequence of 3D mesh frames is at almost the same location for each 3D mesh frame. In an example, the starting vertex has a largest coordinate value. In another example, the starting vertex has a smallest coordinate value. In another example, the starting vertex has a largest Gaussian curvature. In another examples, the starting vertex has a smallest Gaussian curvature. In another example, the starting vertex has a largest local vertex density. In another example, the starting vertex has a smallest local vertex density. In another example, the starting vertex has a largest value for color information. In another example, the starting vertex has a smallest value for color information.

In some examples, from the starting vertex for the 3D mesh frames, the first subset of the vertices is traversed before traversing a vertex out of the first subset. In some examples, boundary vertices of the first patch are traversed before traversing interior vertices (non-boundary) of the first patch.

In some examples, after a traversing of a last vertex in a prior patch (also referred to as old current patch), a next patch (also referred as new current) to traverse is determined from untraversed patches according to spatial relationships of the untraversed patches to the prior patch. Then, a starting vertex in the next patch is determined.

In some examples, the next patch is a closest patch among the untraversed patches to the prior patch. In an example, to calculate a distance between an untraversed patch and the prior patch, a 3D Euclidean distance between the last vertex traversed in the prior patch and each vertex in the untraversed patch is calculated, and a smallest distance in the 3D Euclidean distances is determined to be the distance between the untraversed patch and the prior patch. In another example, to calculate a distance between an untraversed patch and the prior patch, average 3D coordinates of a plurality of vertices in the untraversed patch are calculated, and a distance between the untraversed patch and the prior patch is determined based on a distance between a point having the average 3D coordinates and the last vertex traversed in the prior patch. In another example, to calculate a distance between an untraversed patch and the prior patch, first average 3D coordinates of a first plurality vertices in the prior patch are calculated, second average 3D coordinates of a plurality of vertices in the untraversed patch are calculated, a distance between the untraversed patch and the prior patch is calculated based on a distance between a first point having the first average 3D coordinates and a second point having the second average 3D coordinates.

To determine the starting vertex in the next patch, in an example, a vertex in the next patch having a largest coordinate value is selected as the starting vertex in the next patch. In another example, a vertex in the next patch having a smallest coordinate value is selected as the starting vertex in the next patch. In another example, a vertex in the next patch that is closest to the last vertex traversed in the prior patch is selected as the starting vertex in the next patch. In another example, a boundary vertex in the next patch having a largest coordinate value is selected as the starting vertex in the next patch. In another example, a boundary vertex in the next patch having a smallest coordinate value is selected as the starting vertex in the next patch. In another example, a boundary vertex in the next patch that is closest to the last vertex traversed in the prior patch is selected as the starting vertex in the next patch.

According to an aspect of the disclosure, to form the array of attributes, in some examples, a maximum number of vertices in a mesh frame is determined after vertices traversals of a sequence of mesh frames. Based on the maximum number of vertices, 2D image size can be determined. Then, the attributes of vertices in each of the mesh frames can be re-shaped into 2D arrays of the 2D image size.

To encode the array of attributes, in an example, a 2D image corresponding to an array of 3D coordinates of the vertices is encoded into the bitstream. In another example, a 2D image corresponding to an array of uv coordinates of the vertices is encoded into the bitstream. In another example, a first 2D image and a second 2D image respectively corresponding to a first array of u coordinates of the vertices and a second array of v coordinates of the vertices are encoded into the bitstream. In some examples, 2D image corresponding to an array of other attributes of the vertices (e.g., color information, normal, and the like) is encoded into the bitstream.

In some examples, for each patch, a first value indicative of a number of vertices in the patch is encoded into the bitstream. Further, in some examples, for each patch, a second value indicative of a number of boundary vertices in the patch is encoded into the bitstream.

In some examples, the attributes of the boundary vertices in a patch are encoded into the bitstream before the attributes of other vertices (e.g., non-boundary vertices) in the patch.

In some examples, lossy compression is used. At the encoder side, for a patch, reconstructed attributes of the boundary vertices of the patch are determined based on encoded attributes of the vertices. Then, boundary coordinate residuals for the boundary vertices of the patch are determined based on the reconstructed coordinates of the boundary vertices and the original coordinates of the boundary vertices. The boundary coordinate residuals are encoded into the bitstream. The coordinates of the boundary vertices can be 3D coordinates of the boundary vertices and/or uv coordinates of the boundary vertices.

In some examples, connectivity information of vertices in each patch is encoded into the bitstream.

Then, the process proceeds to (S1499) and terminates.

The process (1400) can be suitably adapted. Step(s) in the process (1400) can be modified and/or omitted. Additional step(s) can be added. Any suitable order of implementation can be used.

Figure 15:
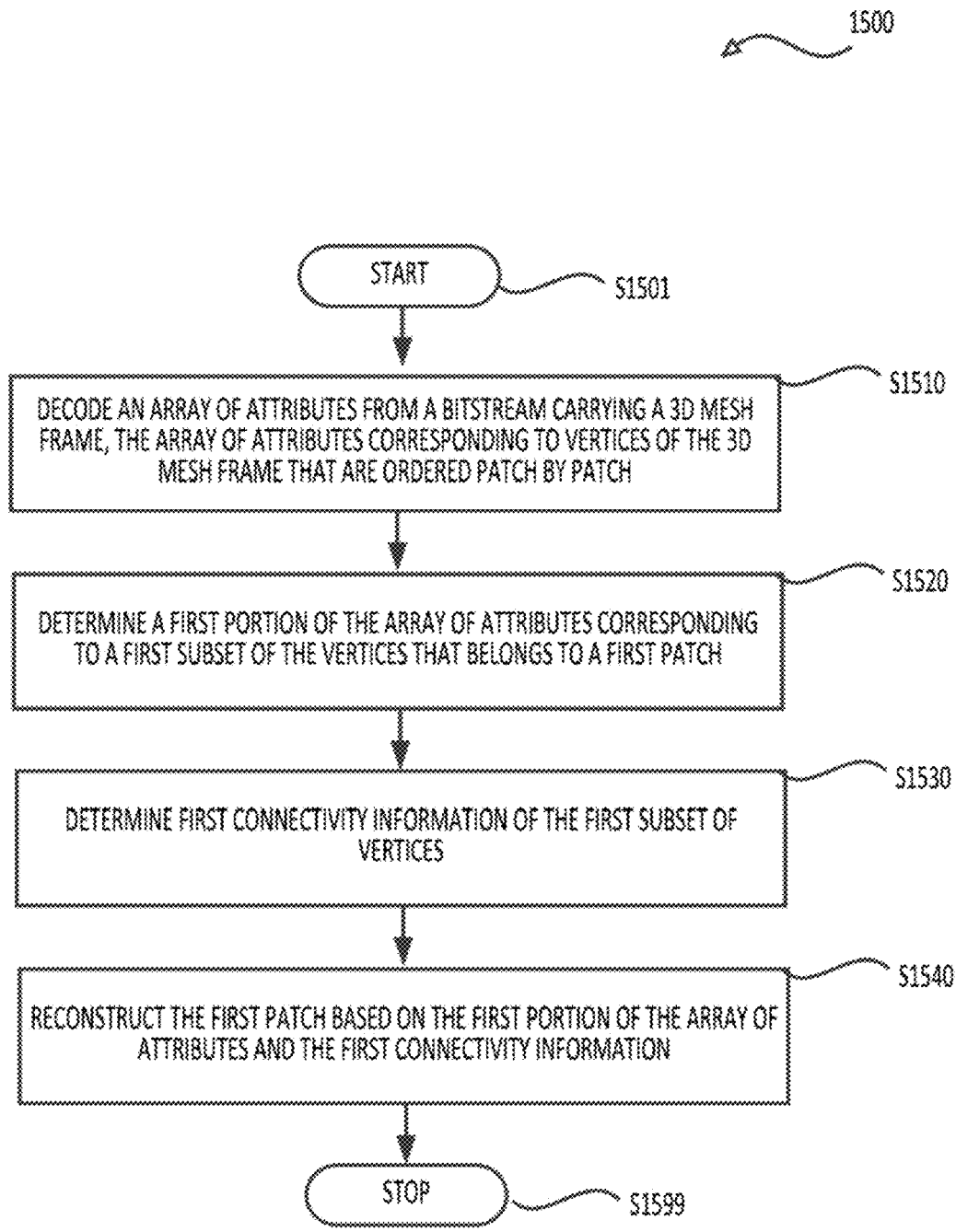
FIG. 15 shows a flow chart outlining a process example in some examples.

FIG. 15 shows a flow chart outlining a process (1500) according to an embodiment of the disclosure. The process (1500) can be used during a decoding process for a mesh. In various embodiments, the process (1500) is executed by processing circuitry. In some embodiments, the process (1500) is implemented in software instructions, thus when the processing circuitry executes the software instructions, the processing circuitry performs the process (1500). The process starts at (S1501) and proceeds to (S1510).

At (S1510), an array of attributes is decoded from a bitstream carrying a 3D mesh frame that includes a plurality of patches. The array of attributes corresponds to vertices of the 3D mesh frame that are ordered patch by patch. For example, the vertices are ordered into subsets respectively belonging to the plurality of patches.

At (S1520), a first portion of the array of attributes corresponding to a first subset of the vertices of the 3D mesh frame is determined. The first subset belongs to a first patch in the plurality of patches.

At (S1530), first connectivity information of the first subset of the vertices is determined.

At (S1540), the first patch of the 3D mesh frame is reconstructed based on the first portion of the array of attributes and the first connectivity information.

To decode the array of attributes, in an example, a 2D image corresponding to an array of 3D coordinates of the vertices is decoded. In another example, a 2D image corresponding to an array of uv coordinates of the vertices is decoded. In another example, a first 2D image and a second 2D image respectively corresponding to a first array of u coordinates of the vertices and a second array of v coordinates of the vertices are decoded.

To determine the first portion of the array of attributes, in an example, a first value indicative of the number of vertices in the first subset of the vertices of the 3D mesh frame is decoded from the bitstream. The first portion of the array of attributes is selected based on the first value. In some examples, a second value indicative of the number of boundary vertices in the first subset is decoded from the bitstream. Then, the attributes of the boundary vertices are determined from the first portion of the array of attributes based on the second value.

In some examples, the attributes of the boundary vertices of the first patch are ordered before the attributes of other vertices in the first subset for the first patch.

In some examples, lossy compression is used for coding attributes of the vertices, such as coordinates of the vertices. In an example, boundary coordinate residuals for the boundary vertices are decoded from the bitstream. The decoded coordinates of the boundary vertices are combined with the boundary coordinate residuals of the boundary vertices to obtain recovered coordinates of the boundary vertices. The recovered coordinates of the boundary vertices can be equal to original coordinates of the boundary vertices at the encoder side. The coordinates of the boundary vertices can be 3D coordinates of the boundary vertices or can be uv coordinates of the boundary vertices.

In some examples, due to lossy compression, duplicated vertices (with same 3D coordinates or same UV coordinates) may exist according to the decoded attributes. In an example, a first vertex and a second vertex have identical coordinates are detected and one of the first vertex and the second vertex is removed from the reconstruction of the 3D mesh frame.

In some examples, due to lossy compression, a non-boundary vertex of a patch may be outside the boundary of the patch. In an example, the non-boundary vertex of the patch that is outside a boundary formed by the boundary vertices of the patch is removed from the reconstruction of the 3D mesh frame.

In some examples, the first connectivity information of the first subset of the vertices for the first patch is inferred based on the first subset of the vertices of the 3D mesh frame.

In some examples, the first connectivity information of the first subset of vertices is decoded from the bitstream.

Then, the process proceeds to (S1599) and terminates.

The process (1500) can be suitably adapted. Step(s) in the process (1500) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
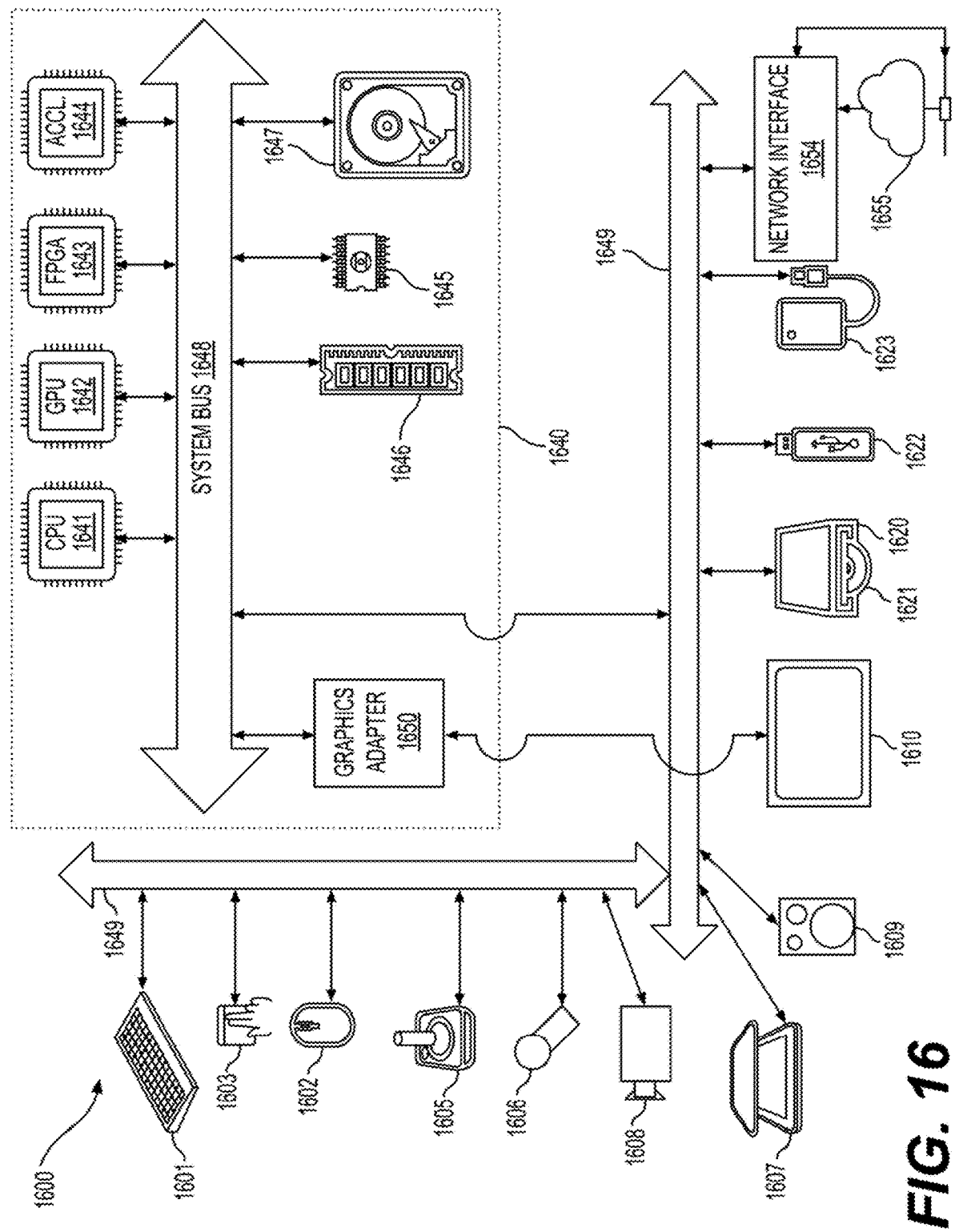
FIG. 16 is a schematic illustration of a computer system in some examples.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression, comprising:
    decoding an array of attributes from a bitstream carrying a three dimensional (3D) mesh frame that includes a plurality of patches, the array of attributes corresponding to vertices of the 3D mesh frame, the vertices of the 3D mesh frame being ordered into subsets respectively belonging to the plurality of patches;
    selecting a first portion of the array of attributes corresponding to a first subset of the vertices of the 3D mesh frame based on a first value decoded from the bitstream that is indicative of a total number of vertices in the first subset of the vertices of the 3D mesh frame, the first subset belonging to a first patch;
    selecting attributes of boundary vertices in the first subset from the first portion of the array of attributes based on a second value, the second value being decoded from the bitstream and indicative of a total number of the boundary vertices in the first subset, the attributes of the boundary vertices being ordered before attributes of other vertices in the first subset;
    determining first connectivity information of the first subset of the vertices; and
    reconstructing the first patch of the 3D mesh frame based on the first portion of the array of attributes and the first connectivity information.

2. The method of claim 1, wherein the decoding the array of attributes further comprises at least one of:
    decoding a 2 dimensional (2D) image corresponding to an array of 3 dimensional coordinates of the vertices;
    decoding a 2D image corresponding to an array of uv coordinates of the vertices; and/or
    decoding a first 2D image and a second 2D image respectively corresponding to a first array of u coordinates of the vertices and a second array of v coordinates of the vertices.

3. The method of claim 1, wherein the attributes of the boundary vertices comprise coordinates of the boundary vertices, and the method further comprises:
    decoding boundary coordinate residuals for the boundary vertices; and
    combining the coordinates of the boundary vertices with the boundary coordinate residuals of the boundary vertices to obtain recovered coordinates of the boundary vertices.

4. The method of claim 3, wherein the coordinates of the boundary vertices comprises at least one of 3 dimensional (3D) coordinates of the boundary vertices and/or uv coordinates of the boundary vertices, and the boundary coordinate residuals for the boundary vertices comprises at least one of boundary 3D coordinates residuals and/or boundary uv coordinates residuals.

5. The method of claim 3, further comprising:
    detecting that a first vertex and a second vertex have identical coordinates; and removing one of the first vertex and the second vertex from the reconstructing.

6. The method of claim 3, further comprising:
detecting that a non-boundary vertex of the first patch is outside a boundary formed by the boundary vertices of the first patch; and
reconstructing the first patch of the 3D mesh frame without the non-boundary vertex.

7. The method of claim 1, wherein the determining the first connectivity information of the first subset of the vertices further comprises:
inferring the first connectivity information of the first subset of the vertices.

8. The method of claim 1, wherein the determining the first connectivity information of the first subset of the vertices further comprises:
decoding, from the bitstream, the first connectivity information of the first subset of the vertices.

9. A method for mesh encoding, comprising:
encoding an array of attributes of a three-dimensional (3D) mesh frame that includes a plurality of patches, the array of attributes corresponding to vertices of the 3D mesh frame, the vertices of the 3D mesh frame being ordered into subsets respectively belonging to the plurality of patches;
selecting a first portion of the array of attributes corresponding to a first subset of the vertices of the 3D mesh frame based on a first value that is indicative of a total number of vertices in the first subset, the first subset belonging to a first patch;
selecting attributes of boundary vertices in the first subset from the first portion of the array of attributes based on a second value indicative of a total number of the boundary vertices in the first subset, the attributes of the boundary vertices being ordered before attributes of other vertices in the first subset;
determining first connectivity information of the first subset of the vertices; and
encoding the first patch of the 3D mesh frame based on the first portion of the array of attributes and the first connectivity information.

10. The method of claim 9, wherein the encoding the array of attributes further comprises at least one of:
encoding a 2-dimensional (2D) image corresponding to an array of 3 dimensional coordinates of the vertices;
encoding a 2D image corresponding to an array of uv coordinates of the vertices; and/or
encoding a first 2D image and a second 2D image respectively corresponding to a first array of u coordinates of the vertices and a second array of v coordinates of the vertices.

11. The method of claim 9, further comprising:
encoding the first value that is indicative of the total number of vertices in the first subset of the vertices of the 3D mesh frame.

12. The method of claim 9, further comprising: encoding the second value indicative of the total number of the boundary vertices in the first subset.

13. The method of claim 9, wherein the attributes of the boundary vertices include coordinates of the boundary vertices, and the method further comprises:
encoding boundary coordinate residuals for the boundary vertices.

14. The method of claim 13, wherein the coordinates of the boundary vertices comprises at least one of 3 dimensional (3D) coordinates of the boundary vertices and/or uv coordinates of the boundary vertices, and the boundary coordinate residuals for the boundary vertices comprises at least one of boundary 3D coordinates residuals and/or boundary uv coordinates residuals.

15. The method of claim 13, further comprising:
detecting that a first vertex and a second vertex have identical coordinates; and
removing one of the first vertex and the second vertex from the first patch of the 3D mesh frame to be encoded.

16. The method of claim 13, further comprising:
detecting that a non-boundary vertex of the first patch is outside a boundary formed by the boundary vertices of the first patch; and
encoding the first patch of the 3D mesh frame without the non-boundary vertex.

17. The method of claim 9, wherein the determining the first connectivity information of the first subset of the vertices further comprises:
inferring the first connectivity information of the first subset of the vertices.

18. A method of processing mesh data, the method comprising:
processing a bitstream that includes the mesh data according to a format rule, wherein:
the bitstream includes an array of attributes carrying a three-dimensional (3D) mesh frame that includes a plurality of patches, the array of attributes corresponding to 3D mesh frame, the vertices of the 3D mesh frame being ordered into subsets respectively belonging to the plurality of patches; and
the format rule specifies that:
a first portion of the array of attributes corresponding to a first subset of the vertices of the 3D mesh frame is selected based on a first value decoded from the bitstream that is indicative of a total number of vertices in the first subset of the vertices of the 3D mesh frame, the first subset belonging to a first patch,
attributes of boundary vertices in the first subset are selected from the first portion of the array of attributes based on a second value, the second value being decoded from the bitstream and indicative of a total number of the boundary vertices in the first subset, the attributes of the boundary vertices being ordered before attributes of other vertices in the first subset,
first connectivity information of the first subset of the vertices is determined, and
the first patch of the 3D mesh frame is processed based on the first portion of the array of attributes and the first connectivity information.

19. The method of claim 18, wherein the format rule specifies that:
a 2 dimensional (2D) image corresponding to an array of 3 dimensional coordinates of the vertices is decoded;
a 2D image corresponding to an array of uv coordinates of the vertices is decoded; and/or
a first 2D image corresponding to a first array of u coordinates of the vertices and a second 2D image corresponding to a second array of v coordinates of the vertices are decoded respectively.

20. The method of claim 18, wherein:
the attributes of the boundary vertices include coordinates of the boundary vertices; and
the format rule specifies that:
boundary coordinate residuals are decoded for the boundary vertices; and the coordinates of the boundary vertices are combined with the boundary coordinate residuals of the boundary vertices to obtain recovered coordinates of the boundary vertices.

* * * * *